(12) United States Patent
Nagasaka et al.

(10) Patent No.: US 10,908,697 B2
(45) Date of Patent: Feb. 2, 2021

(54) CHARACTER EDITING BASED ON SELECTION OF AN ALLOCATION PATTERN ALLOCATING CHARACTERS OF A CHARACTER ARRAY TO A PLURALITY OF SELECTABLE KEYS

(71) Applicant: KYOCERA Corporation, Kyoto (JP)

(72) Inventors: Yushi Nagasaka, Ritto (JP); Masato Fujishiro, Yokohama (JP); Atsuhisa Inakoshi, Yokohama (JP); Katsuhiro Mitsui, Ritto (JP); Yukiko Takaba, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 234 days.

(21) Appl. No.: 15/634,969

(22) Filed: Jun. 27, 2017

(65) Prior Publication Data
US 2018/0004303 A1    Jan. 4, 2018

(30) Foreign Application Priority Data

Jun. 29, 2016 (JP) ................. 2016-129311

(51) Int. Cl.
*G06F 3/01* (2006.01)
*G06F 3/0488* (2013.01)

(52) U.S. Cl.
CPC .......... *G06F 3/018* (2013.01); *G06F 3/04886* (2013.01)

(58) Field of Classification Search
CPC .... G06F 3/018; G06F 3/04886; G06F 3/0235; G06F 3/0237; G06F 3/0236
See application file for complete search history.

(56) References Cited

U.S. PATENT DOCUMENTS

| | | | | |
|---|---|---|---|---|
| 2011/0018812 A1* | 1/2011 | Baird | ................ | G06F 3/04886 345/173 |
| 2011/0035209 A1* | 2/2011 | Macfarlane | .......... | G06F 40/232 704/9 |
| 2012/0262488 A1 | 10/2012 | Liu et al. | | |
| 2012/0296647 A1* | 11/2012 | Kobayashi | .............. | G06F 3/018 704/235 |
| 2015/0161099 A1* | 6/2015 | Lee | ........................ | G06F 9/454 345/171 |
| 2017/0003873 A1* | 1/2017 | Park | .................... | G06F 3/04886 |
| 2017/0277430 A1* | 9/2017 | Ukai | .................... | G06F 3/0482 |

FOREIGN PATENT DOCUMENTS

| | | |
|---|---|---|
| JP | 2012-32894 A | 2/2012 |
| JP | 2013-515984 A | 5/2013 |

* cited by examiner

*Primary Examiner* — Abdullah Al Kawsar
*Assistant Examiner* — Kenny Nguyen
(74) *Attorney, Agent, or Firm* — Hauptman Ham, LLP

(57) ABSTRACT

An electronic device comprising a touch screen, a plurality of first keys arranged along a periphery of the touch screen, a storage configured to stores a character array, and at least one controller configured to execute a character editing process according to an operation on the first key by allocating at least one of characters and phrases included in the character array to each of the first keys and accepting, when detecting the operation on one of the first keys, editing the at least one of the characters and the phrases allocated to the first key on which the operation is detected.

15 Claims, 29 Drawing Sheets

FIG.6

|    | DISPLAY IMAGE | POSSIBLE INPUT |
|----|---------------|----------------|
| 1  | あ ROW        | あ             |
| 2  | か ROW        | か             |
| 3  | さ ROW        | さ             |
| 4  | た ROW        | た             |
| 5  | な ROW        | な             |
| 6  | は ROW        | は             |
| 7  | ま ROW        | ま             |
| 8  | や ROW        | や             |
| 9  | ら ROW        | ら             |
| 10 | わ ROW        | わ             |

FIG.7

| FIRST KEY | あ ROW | か ROW | さ ROW | た ROW | な ROW | は ROW | ま ROW | や ROW | ら ROW | わ ROW |
|---|---|---|---|---|---|---|---|---|---|---|
| 1 | あ | か | さ | た | な | は | ま | や | ら | わ |
| 2 | い | き | し | ち | に | ひ | み | ゆ | り | を |
| 3 | う | く | す | つ | ぬ | ふ | む | よ | る | ん |
| 4 | え | け | せ | て | ね | へ | め | | れ | |
| 5 | お | こ | そ | と | の | ほ | も | | ろ | |
| 6 | LINE BREAK | LINE BREAK | LINE BREAK | LINE BREAK | LINE BREAK | LINE BREAK | LINE BREAK | LINE BREAK | LINE BREAK | LINE BREAK |
| 7 | DELETE | DELETE | DELETE | DELETE | DELETE | DELETE | DELETE | DELETE | DELETE | DELETE |
| 8 | ALPHA-NUMERAL | ALPHA-NUMERAL | ALPHA-NUMERAL | ALPHA-NUMERAL | ALPHA-NUMERAL | ALPHA-NUMERAL | ALPHA-NUMERAL | ALPHA-NUMERAL | ALPHA-NUMERAL | ALPHA-NUMERAL |
| 9 | 、。あ⇔あ | 、。あ⇔あ | 、。あ⇔あ | 、。あ⇔あ | 、。あ⇔あ | 、。あ⇔あ | 、。あ⇔あ | 、。あ⇔あ | 、。あ⇔あ | 、。あ⇔あ |
| 10 | READ | READ | READ | READ | READ | READ | READ | READ | READ | READ |

FIG.8

|  | DISPLAY IMAGE | POSSIBLE INPUT |
|---|---|---|
| 1 | abc | a |
| 2 | def | d |
| 3 | ghi | g |
| 4 | jkl | j |
| 5 | mno | m |
| 6 | pqrs | p |
| 7 | tuv | t |
| 8 | wxyz | w |
| 9 | ./@ | . |
| 10 | a⇔A | |

FIG.9

| FIRST KEY | abc | def | ghi | jkl | mno | pqrs | tuv | wxyz | ./@ |
|---|---|---|---|---|---|---|---|---|---|
| 1 | a | d | g | j | m | p | t | w | . |
| 2 | b | e | h | k | n | q | u | x | / |
| 3 | c | f | i | l | o | r | v | y | @ |
| 4 | A | D | G | J | M | s | T | z | |
| 5 | B | E | H | K | N | P | U | W | |
| 6 | C | F | I | L | O | Q | V | X | |
| 7 | | | | | | R | | Y | |
| 8 | | | | | | S | | Z | |
| 9 | | | | | | | | | |
| 10 | | | | | | | | | |

| FIRST KEY | 50j | 50i | 50h | 50g | 50f | 50e | 50d | 50c | 50b | 50a |
|---|---|---|---|---|---|---|---|---|---|---|
| PATTERN P1 | 前へ | ま | た | ご | じ | っ | お | あ | い | 後へ |
| PATTERN P2 | 前へ | ま | た | 後 | 日 | お | 金 | い | で | 後へ |
| PATTERN P3 | 前へ | また後日… | ごじつ | おあい | できる | こと | を | こころまち | に | 後へ |
| PATTERN P4 | 前へ | また後日… | 心待ち | ところで… | ていた… | 少し回答… | けませ ん… | お手数お… | し訳あり… | 後へ | ks
CHARACTER EDITING BASED ON SELECTION OF AN ALLOCATION PATTERN ALLOCATING CHARACTERS OF A CHARACTER ARRAY TO A PLURALITY OF SELECTABLE KEYS

CROSS-REFERENCE TO RELATED APPLICATION

The present application claims priority to and incorporates by reference the entire contents of Japanese Patent Application No. 2016-129311 filed in Japan on Jun. 29, 2016.

FIELD

The present application relates to an electronic device, a control method and a non-transitory storage medium.

BACKGROUND

There are electronic devices in which a cursor is moved to an editing position to edit characters.

The electronic devices exemplified above, for example, leave room for improvement in technologies relating to character editing operations because it is difficult for visually impaired people to move the cursor to the editing position.

SUMMARY

An electronic device, a control method, and a non-transitory storage medium are disclosed.

According to one aspect, there is provided an electronic device comprising: a touch screen; a plurality of first keys arranged along a periphery of the touch screen; a storage configured to stores a character array; and at least one controller configured to execute a character editing process according to an operation on the first key by allocating at least one of characters and phrases included in the character array to each of the first keys and accepting, when detecting the operation on one of the first keys, editing the at least one of the characters and the phrases allocated to the first key on which the operation is detected.

According to one aspect, there is provided a control method performed by an electronic device including a touch screen, a plurality of first keys arranged along a periphery of the touch screen, and a storage configured to store a character array, the control method comprising: executing a character editing process according to an operation on the first key by; allocating at least one of characters and phrases included in the character array to each of the first keys; and accepting, when detecting the operation on one of the first keys, editing the at least one of the characters and the phrases allocated to the first key on which the operation is detected.

According to one aspect, there is provided a non-transitory storage medium that stores a program for causing, when executed by an electronic device including a touch screen, a plurality of first keys arranged along a periphery of the touch screen, and a storage configured to store a character array, to execute: executing a character editing process according to an operation on the first key by; allocating at least one of characters and phrases included in the character array to each of the first keys; and accepting, when detecting the operation on one of the first keys, editing the at least one of the characters and the phrases allocated to the first key on which the operation is detected.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 6 is a table representing exemplary first key data;
FIG. 7 is a table representing exemplary second key data;
FIG. 8 is a table representing exemplary first key data;
FIG. 9 is a table representing exemplary second key data;
FIG. 11 is a diagram illustrating exemplary document data;
FIG. 12 is a table illustrating allocation of characters or character arrays to first keys.

DETAILED DESCRIPTION OF THE PREFERRED EMBODIMENTS

Embodiments for the electronic device, the control method and the program according to the present application will be described in detail with reference to the accompanying drawings. A smartphone will be described as an exemplary electronic device.

Figure 1:
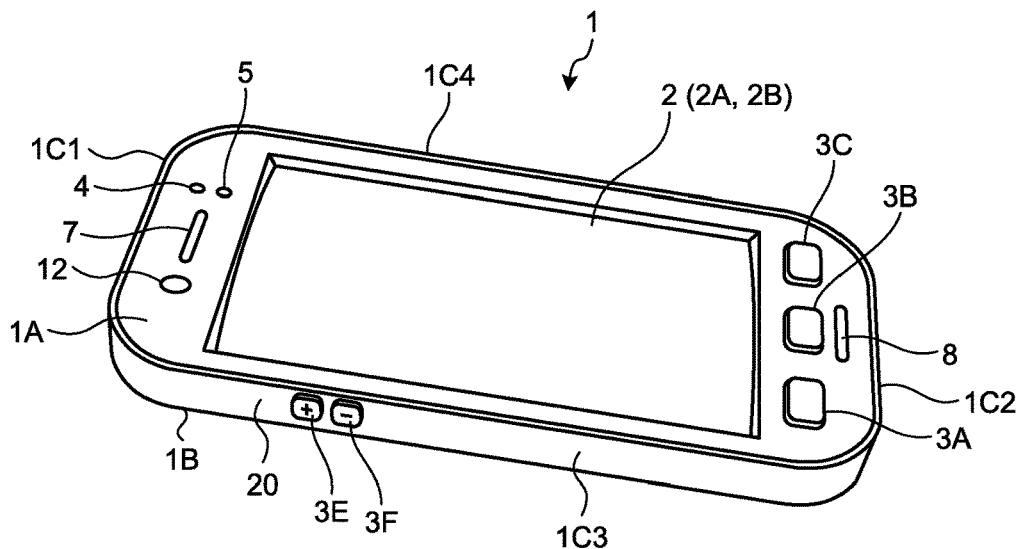
FIG. 1 is a perspective view of a smartphone according to an embodiment.
Figure 2:
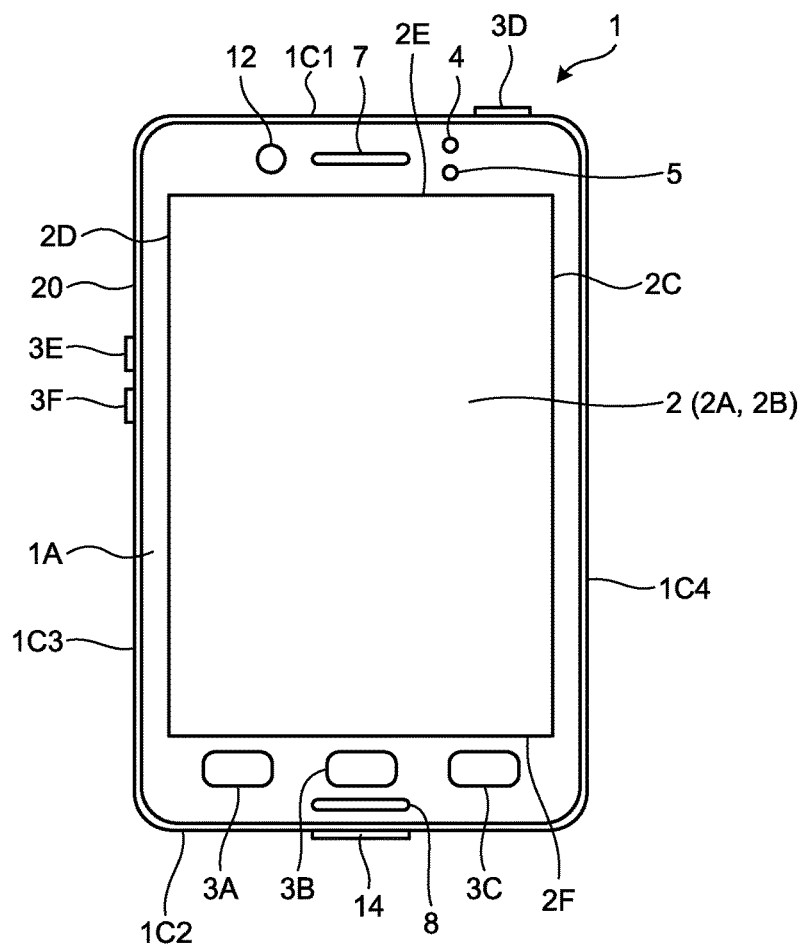
FIG. 2 is a front view of the smartphone.
Figure 3:
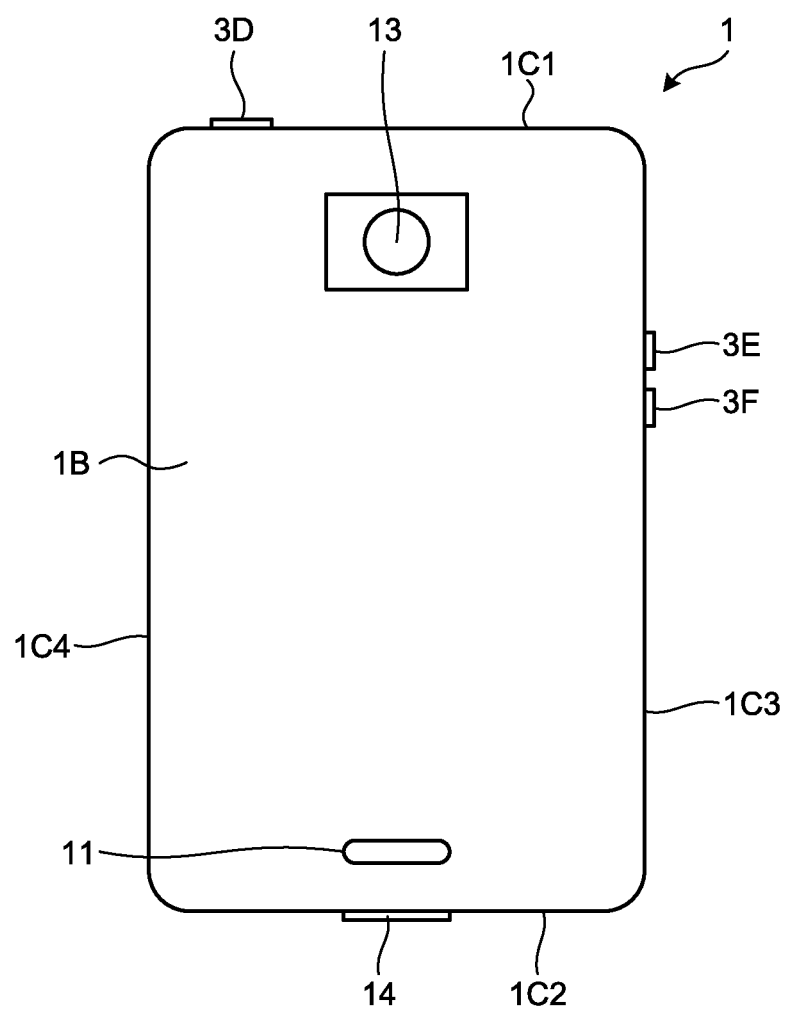
FIG. 3 is a rear view of the smartphone.

An entire configuration of a smartphone 1 according to an embodiment will be described with reference to FIGS. 1 to 3. As illustrated in FIGS. 1 to 3, the smartphone 1 includes a housing 20. The housing 20 includes a front face 1A, a rear face 1B and side faces 1C1 to 1C4. The front face 1A is a front face of the housing 20. The rear face 1B is a back face of the housing 20. The side faces 1C1 to 1C4 are side faces connecting the front face 1A and the back face 1B. The side faces 1C1 to 1C4 may be generally referred to as side face 1C without specifying which face.

The smartphone 1 includes a touch screen display 2, buttons (keys) 3A to 3C, an illuminance sensor 4, a proximity sensor 5, a receiver 7, a microphone 8 and a camera 12 on the front face 1A. The smartphone 1 includes a speaker 11 and a camera 13 on the rear face 1B. The smartphone 1 includes buttons 3D to 3F and a connector 14 on the side face 1C. The buttons 3A to 3F may be generally referred to as buttons 3 below without specifying which button.

The touch screen display 2 includes a display 2A and a touch screen 2B. In the example illustrated in FIG. 1, each of the display 2A and the touch screen 2B is approximately rectangle; however, the shape of the display 2A and the touch screen 2B is not limited thereto. Each of the display 2A and the touch screen 2B may have any shape and is, for example, square or circular. In the example illustrated in FIG. 1, the display 2A and the touch screen 2B are disposed in a layered manner; however, the arrangement of the display 2A and the touch screen 2B is not limited thereto. For example, the display 2A and the touch screen 2B may be arranged side by side or arrange separately. In the example illustrated in FIG. 1, the long sides of the display 2A are along the long sides of the touch screen 2B and the short sides of the display 2A are along the short sides of the touch screen 2B; however, the manner of layering the display 2A and the touch screen 2B is not limited thereto. When the display 2A and the touch screen 2B are arranged in a layered manner, for example, at least one side of the display 2A need not be along any side of the touch screen 2B. The touch screen display 2 is rectangular and the four sides 2C, 2D, 2E and 2F are adjacent to the side faces 1C1 to 1C4 of the housing 20, respectively. The side 2C of the touch screen display 2 is adjacent to the side face 1C4 of the housing 20. The side 2D of the touch screen display 2 is adjacent to the side face 1C3 of the housing 20.

The display 2A includes a display device, such as a liquid crystal display (LCD), an organic electro-luminescence display (OELD) or an inorganic electro-luminescence display (IELD). The display 2A displays, for example, characters, images, symbols, diagrams, etc.

The touch screen 2B detects contact of a finger, a pen, or a stylus pen on the touch screen 2B. The touch screen 2B detects a position in the touch screen 2B contacted by multiple fingers, a pen or a stylus pen. In the following descriptions, for example, the finger, the pen or the stylus pen that contacts the touch screen 2B may be referred to as a "contacting object".

The detection system of the touch screen 2B may be any method, such as a capacitance method, a resistance film method, a surface acoustic wave method or a load sensing method. In order to simplify the following descriptions, it is assumed that the user contacts the touch screen 2B with the fingers to operate the smartphone 1.

The smartphone 1 determines the type of gesture based on at least one of a contact that is detected by the touch screen 2B, a position in which the contact is detected, a change of a position in which the contact is detected, a time interval between detected contacts and the number of times the contact is detected. Gestures are operations performed on the touch screen 2B. Examples of gestures determined by the smartphone 1 include, but are not limited to, touch, long touch, release, swipe, tap, double tap, long tap, drag, flick, pinch-in, pinch-out, etc.

The smartphone 1 performs operations according to the gestures that are determined via the touch screen 2B. This realizes intuitive and easy operability to users. The operations performed by the smartphone 1 according to the determined gestures may vary depending on the screen that is displayed on the display 2A. In order to simplify the following descriptions, "detection of contact by the touch screen 2B and determination by the smartphone 1 based on the detected contact that the type of a gesture is X" may be referred to as "detection of X by the smartphone" or "detection of X by the controller" below.

Figure 4:
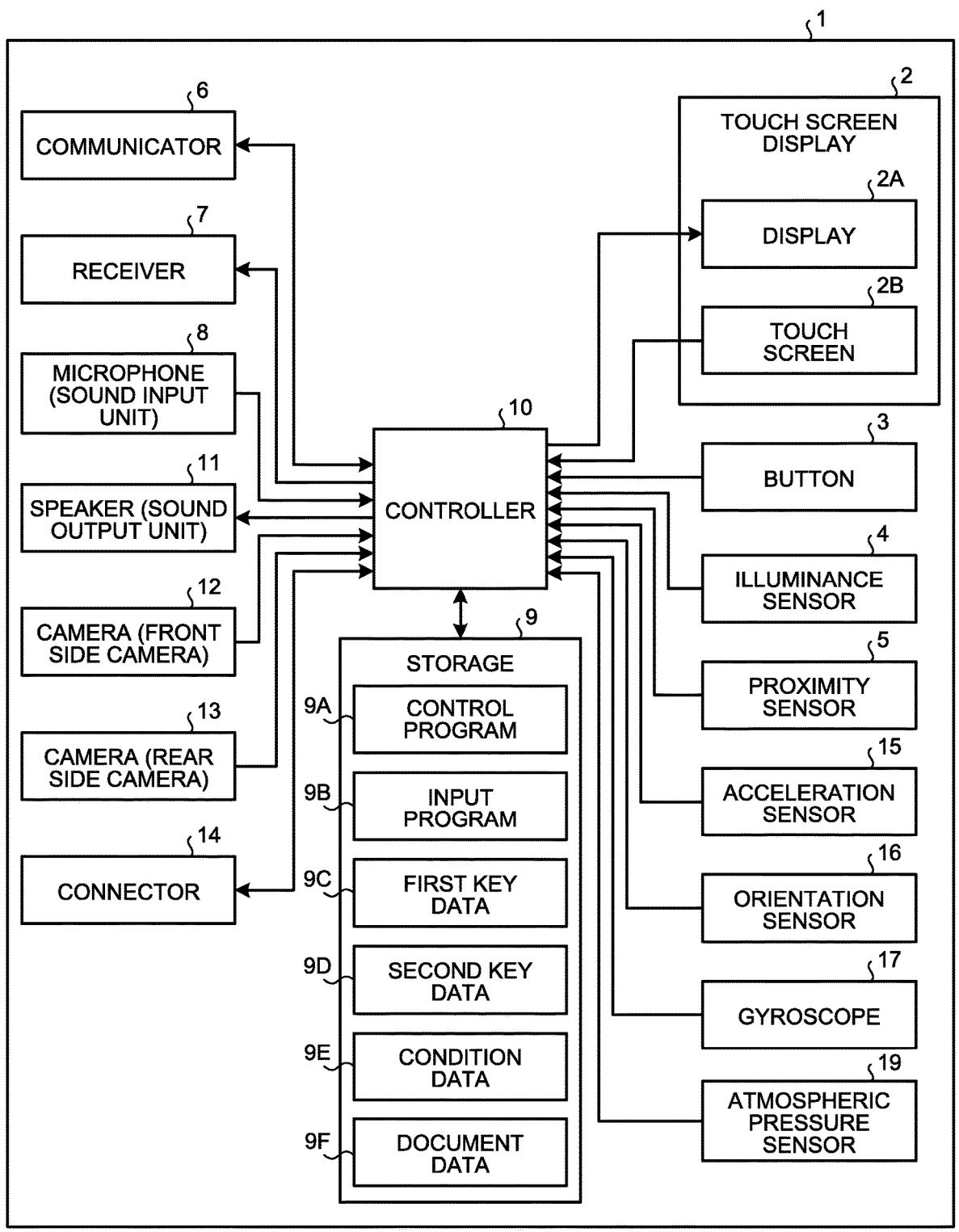
FIG. 4 is a block diagram of the smartphone.

FIG. 4 is a block diagram of the smartphone 1. The smartphone 1 includes the touch screen display 2, the buttons 3, the illuminance sensor 4, the proximity sensor 5, a communicator 6, the receiver 7, the microphone 8, a storage 9, a controller 10, the speaker 11, the cameras 12 and 13, the connector 14, an acceleration sensor 15, an orientation sensor 16, a gyroscope 17, and an atmospheric pressure sensor 19.

As described above, the touch screen display 2 includes the display 2A and the touch screen 2B. The display 2A displays, for example, characters, images, symbols and diagrams. The touch screen 2B detects contact. The controller 10 detects a gesture with respect to the smartphone 1. Specifically, the controller 10 cooperates with the touch screen 2B to detect operations (gestures) with respect to the touch screen 2B (the touch screen display 2).

Figure 5:
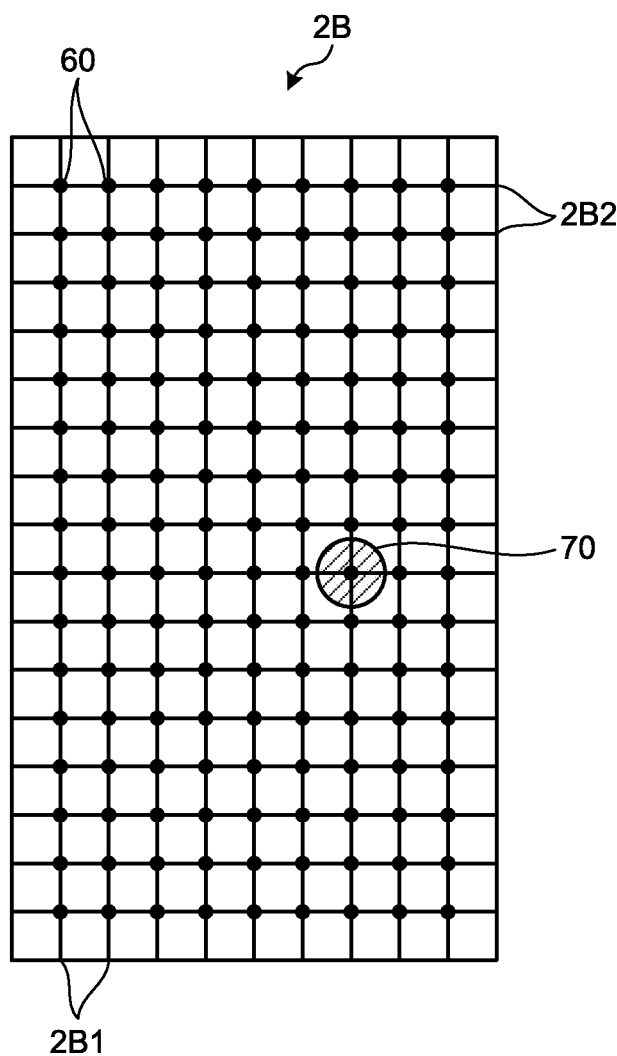
FIG. 5 is a diagram illustrating an exemplary detection configuration in a touch screen.

As illustrated in FIG. 5, the touch screen 2B includes multiple first electrodes 2B1 and multiple second electrodes 2B2. The first electrodes 2B1 are electrodes extending along a direction of long sides of the touch screen 2B. The second electrodes 2B2 are electrodes extending along a direction of short sides of the touch screen 2B. The first electrodes 2B1 and the second electrodes 2B2 intersect in a matrix. Each of the intersections of the first electrode 2B1 and the second electrode 2B2 serves as a detection point 60 of the touch screen 2B. The touch screen 2B contains multiple detention points 60. The smartphone 1 uses the detection points 60 to specify the position/point of contact in which a contacting object contacts the touch screen 2B. The detection points 60 are positioned in a matrix.

In the touch screen 2B, when a conductive contacting object gets close to the first electrodes 2B1 and the second electrodes 2B2, capacitive coupling occurs between the contacting object and the electrodes. In the touch screen 2B, the detection value at the detection point 60 between the electrodes at which capacitive coupling occurs varies. In the example illustrated in FIG. 5, in the touch screen 2B, the detection values at the detection points 60 around a point 70 contacted by the contacting object is larger than the detection values at other detection points 60. The smartphone 1 is thus able to detect the point 70 contacted by the contacting object with the touch screen 2B based on the varied detection values at the detection points 60.

The buttons 3 are operated by a user of the smartphone 1. The buttons 3 include the buttons 3A to 3F. The controller 10 cooperates with the buttons 3 to detect operations on the buttons 3. The operation on the buttons 3 includes, for example, click, double click, triple click, push and multi-push; however, the operations are not limited thereto.

The buttons 3A to 3C are, for example, a home button, a back button and a menu button. The button 3D is, for example, a power on/off button of the smartphone 1. The button 3D may also serve as a sleep/sleep-release button. The buttons 3E and 3F are, for example, volume buttons.

The illuminance sensor 4 detects illuminance of light around the smartphone 1. The illuminance includes the intensity, brightness or luminance of the light. For example, the illuminance sensor 4 is used to adjust the luminance of the display 2A. The proximity sensor 5 enables contactless detection of the presence of an object in the vicinity. The proximity sensor 5 detects the presence of an object based on, for example, a change in the magnetic field or a change in a return time of a reflective wave of ultrasound. The proximity sensor 5, for example, detects that the touch screen display 2 is moved to be close to a face. The illuminance sensor 4 and the proximity sensor 5 may be configured as a single sensor. The illuminance sensor 4 may be used as a proximity sensor.

The communicator 6 communicates wirelessly. The communication systems supported by the communicator 6 are wireless communication standards. The wireless communication standards are, for example, communication standards for, for example, 2G, 3G or 4G cellular phones. Examples of cellular phone communication standards include, but are not limited to, LTE (Long Term Evolution), W-CDMA (Wideband Code Division Multiple Access), CDMA2000 (Wideband Code Division Multiple Access 2000), PDC (Personal Digital Cellular), GSM (trademark) (Global System for Mobile Communications), PHS (Personal Handy-phone System), etc. The wireless communication standards further include, for example, WiMAX (Worldwide Interoperability for Microwave Access), IEEE802.11, Bluetooth (trademark), IrDA (Infrared Data Association) and NFC (Near Field Communication). The communicator 6 may support at least one of the communication standards listed above.

The receiver 7 and the speaker 11 are an exemplary output unit that outputs sound. The receiver 7 and the speaker 11 are able to output, as sound, a sound signal that is transmitted from the controller 10. The receiver 7 may be used to output voice of a partner on calling. The speaker 11 may be used to output, for example, ringtone and music. Any one of the receiver 7 and the speaker 11 may have both of the functions. The microphone 8 is an exemplary input unit that inputs sound. The microphone 8 is able to convert, for example, voice of the user into a sound signal and transmit the sound signal to the controller 10.

The storage 9 is able to store programs and data. The storage 9 may be also used as a work area in which the results of processes performed by the controller 10 are temporarily stored. The storage 9 may include a recording medium. The recording medium may include any non-transitory storage medium, such as a semiconductor storage medium or a magnetic storage medium. The storage 9 may include multiple types of storage media. The storage 9 may include a combination of a portable storage medium, such as a memory card, an optical disk or a magneto-optical disk, and a storage-medium read device. The storage 9 may include a storage device that is used as a temporary storage area, such as a random access memory (RAM).

The programs stored in the storage 9 include an application that is executed on the foreground or the background and a control program that supports operations of the application. The application, for example, displays a screen on the display 2A and causes the controller 10 to execute a process corresponding to a gesture that is detected via the touch screen 2B. The control program is, for example, an OS. The application and the control program may be installed in the storage 9 via wireless communications by the communicator 6 or a non-transitory storage medium.

The storage 9 stores, for example, a control program 9A, an input program 9B, first key data 9C, second key data 9D, condition data 9E and document data 9F.

The control program 9A is able to provide functions relating to various types of control for causing the smartphone 1 to operate. The control program 9A realizes a calling by, for example, controlling the communicator 6, the receiver 7 and the microphone 8. The functions that are provided by the control program 9A include a function of performing various types of control to, for example, change the information displayed on the display 2A according to the gestures that are detected via the touch screen 2B. The functions that are provided by the control program 9A include a function of detecting movement or stop of the user who has the smartphone 1 by controlling the acceleration sensor 15 and the atmospheric pressure sensor 19. A function that is provided by the control program 9A may be used in combination with a function that is provided by another program, such as a calculation application or a calling application.

The input program 9B is able to provide a function for inputting texts (characters) to the smartphone 1. The input program 9B displays first keys in a first key area and displays second keys in a second key area to enable character input. The specific method of inputting characters will be described later. The input program 9B may include a function enabling the character input by using another input method. The input program 9B is able to provide a function of reading target information. The input program 9B is able to provide a function of editing characters.

The first key data 9C contains information on the first keys displayed in the first key area that is set by the input program 9B. The second key data 9D contains information on the second keys displayed in the second key area that is set by the input program 9B. The second key data 9D is key data associated with the first key data 9C.

The exemplary first key data 9C and second key data 9D will be described with reference to FIGS. 6 and 7. FIG. 6 is a table representing the exemplary first key data. FIG. 7 is a table representing the exemplary second key data. FIGS. 6 and 7 are exemplary data to perform Japanese "kana" input. Display images and possible inputs in the first key data 9C are allocated to the first keys in the first key area. For example, a display image of "あ row" (a row) and a possible input of "あ" (a) are allocated to 1 of the first key. A display image of "か row" (ka row) and a possible input of "か" (ka) are allocated to "2" of the first key. The second key data 9D stores correspondence of the second keys contained in the second key area with the first keys. Multiple characters that are allocated to the second keys serve as display images and any one of the characters serves as a possible input. For example, for "あ row" (a row) of the first key, "あ" (a) is allocated to 1 of the second key, "い" (i) is allocated to 2 of the second key, "う" (u) is allocated to 3 of the second key, "え" (e) is allocated to 4 of the second key, "お" (o) is allocated to 5 of the second key, and "line break" is allocated to 6 of the second key, where line break and deletion does not show characters to be input but processing executed when characters are input.

The examples of the first key data 9C and the second key data 9D will be described with reference to FIGS. 8 and 9. FIG. 8 is a table representing the exemplary first key data. FIG. 9 is a table representing the exemplary second key data. FIGS. 8 and 9 are exemplary data for performing alphabet input. Display images and possible inputs in the first key data 9C are allocated to the first keys contained in the first key area. For example, a display image of "abc" and a possible input of "a" are allocated to 1 of a first key. A display image of "def" and a possible input of "d" are allocated to 2 of the first key. The second key data 9D stores correspondence of the second keys contained in the second key area with the first keys. Multiple characters that are allocated to the second keys serve as display images and any one of the characters serves as a possible input. For example, for "abc" of the first key, "a" is allocated to 1 of the second key, "b" is allocated to 2 of the second key, "c" is allocated to 3 of the second key, "A" is allocated to 4 of the second key, "B" is allocated to 5 of the second key, and "C" is allocated to 6 of the second key.

The relationship among association between the first key data 9C and the second key data 9D, display and character input will be described later. In the above-described embodiment, one character is allocated to one key. Alternatively, a character array consisting of two or more characters, such as a word or a sentence, may be allocated to one key. For example, " ありがとうございます " (arigatou gozaimasu) or " 明日 " (asu) may be allocated as a possible input to one of the second keys corresponding to " あ row" (a row). A combination of two or more characters which do not have any meanings may be allocated to one key.

In the condition data 9E, various conditions to execute processes by the input program 9B are set. Specifically, in the condition data 9E, a correspondence relationship between detected touch gestures and processes to be executed, program conditions, and stop conditions are set.

The document data 9F contains information, such as character arrays and characters. A character array includes multiple characters. Characters include, for example, kanji characters, hiragana characters, katakana characters, the alphabet and numbers. For example, the document data 9F is created by executing the input program 9B. For example, the document data 9F is acquired from another electronic device via the communicator 6.

The controller 10 includes an arithmetic processing device. The arithmetic processing device includes, for example, central processing units (CPU), system-on-a-chips (SoC), micro control units (MCU), field-programmable gate arrays (FPGA) and coprocessors; however, arithmetic processing devices are not limited thereto. The controller 10 is able to integrally control operations of the smartphone 1. Various functions of the controller 10 are implemented according to the control by the controller 10.

Specifically, the controller 10 is able to execute commands that are contained in the programs stored in the storage 9. The controller 10 is able to refer to the data stored in the storage 9 when necessary. The controller 10 controls a function module according to the data and commands. The controller 10 implements various functions by controlling the function module. The function module includes, for example, the display 2A, the communicator 6, the receiver 7 and the speaker 11; however, the function module is not limited thereto. The controller 10 may change the control according to a result of detection by a detection module.

Detection module includes, for example, the touch screen 2B, the buttons 3, the illuminance sensor 4, the proximity sensor 5, the microphone 8, the camera 12, the camera 13, the acceleration sensor 15, the orientation sensor 16, the gyroscope 17, and the atmospheric pressure sensor 19; however, the detection module is not limited thereto.

For example, by executing the control program 9A or the input program 9B, the controller 10 is able to execute various types of control to, for example, change the information that is displayed on the display 2A according to the gesture that is detected via the touch screen 2B.

The camera 12 is a front side camera that images an object facing the front face 1A. The camera 13 is a rear side camera that images an object facing the rear face 1B.

The connector 14 is a terminal to which another device is connected. The connector 14 may be a general-purpose terminal, such as a universal serial bus (USB), a high-definition multimedia interface (HDMI) (trademark), light peak (thunderbolt) (trademark) or an earphone/mic connector. The connector 14 may be a dedicated terminal, such as a Dock connector. The device connected to the connector 14 includes, for example, external storages, speakers, and communication devices; however, the device is not limited thereto.

The acceleration sensor 15 is able to detect the direction and magnitude of acceleration act on the smartphone 1. The orientation sensor 16 is able to detect a direction of the earth magnetism. The gyroscope 17 is able to detect an angle and an angular velocity of the smartphone 1. The atmospheric pressure sensor 19 is able to detect pressure act on the smartphone 1. The results of detection by the acceleration sensor 15, the orientation sensor 16, the gyroscope 17 and the atmospheric pressure sensor 19 are used in combination to detect changes in a position and an attitude of the smartphone 1.

Part or all of the programs and data stored in the storage 9 may be downloaded from another device by wireless communication by the communicator 6. Part or all of the programs and data stored in the storage 9 in FIG. 4 may be stored in a non-transitory storage medium readable by a read device contained in the storage 9. Part or all of the programs and data stored in the storage 9 in FIG. 4 may be stored in a non-transitory storage medium readable by a read device that is connected to the connector 14. The non-transitory storage medium includes, for example, optical disks, such as a CD (trademark), a DVD (trademark) or a Blu-ray (trademark), magneto-optical disks, magnetic storage media, memory cards, and solid-state storage media; however, the non-transitory storage medium is not limited thereto.

The configuration of the smartphone 1 illustrated in FIG. 4 is an example only. The configuration may be modified within the scope of the application. For example, the number of and the type of the buttons 3 are not limited to the example illustrated in FIG. 4. The smartphone 1 may include, instead of the buttons 3A to 3C, buttons in the numeric-keypad layout or QWERTY layout as the buttons for screen operation. The smartphone 1 may include only one button for screen operation or include no button. In the example illustrated in FIG. 4, the smartphone 1 includes two cameras. Alternatively, the smartphone 1 may include only one camera or include no camera. In the example illustrated in FIG. 4, the smartphone 1 includes four types of sensors in order to detect the position and attitude thereof. The smartphone need not include some of the sensors. Alternatively, the smartphone 1 may include another type of sensor to detect at least one of the position and attitude.

Figure 10:
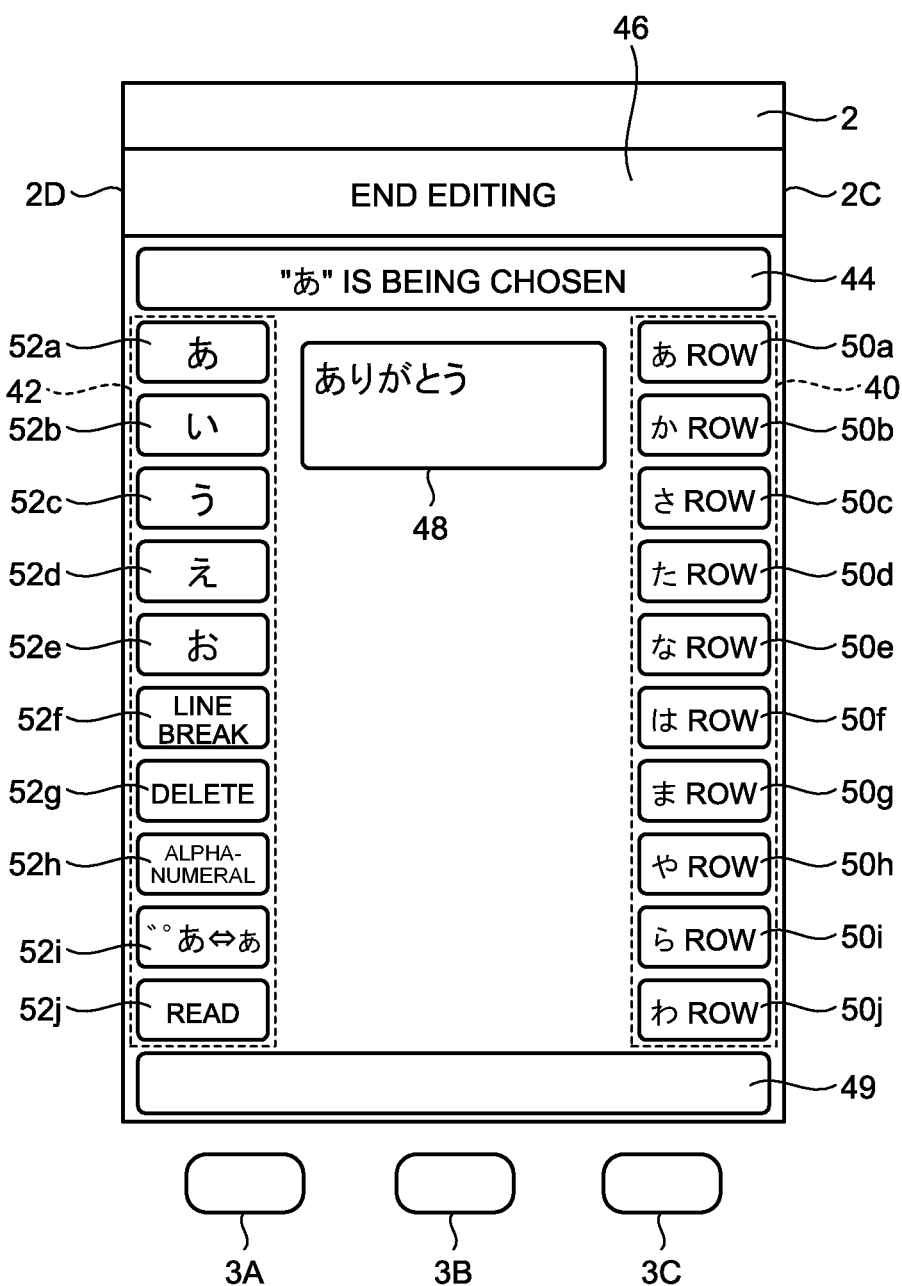
FIG. 10 is a diagram illustrating an exemplary display screen.

With reference to FIG. 10, a character input process performed by the smartphone 1 will be described. FIG. 10 is a diagram illustrating an exemplary display screen. The smartphone 1 displays the screen illustrated in FIG. 10 when executing the character input process by using the input program 9B. The screen illustrated in FIG. 10 includes a first key area 40, a second key area 42, a state notifying field 44, an end key 46, an input text display field 48 and a determination key 49. Each of the first key area 40 and the second key area 42 contains an area in which multiple software keys are displayed. The first key area 40 and the second key area 42 are provided in a position in which the first key area 40 and the second key area 42 overlap the touch screen 2B.

The first key area 40 is provided along the side 2C of the touch screen display 2 and is adjacent to the side 2C. In other words, the first key area 40 is adjacent to the side face 1C4 of the housing 20. In the first key area 40, multiple first keys 50a, 50b, 50c, 50d, 50e, 50f, 50g, 50h, 50i and 50j are displayed. The first keys 50a, 50b, 50c, 50d, 50e, 50f, 50g, 50h, 50i and 50j are arranged sequentially along the side 2C from the top side of the screen to the bottom side. Each of the contents of 1 to 10 of the first key data 9C are allocated to each of the first keys 50a, 50b, 50c, 50d, 50e, 50f, 50g, 50h, 50i and 50j in the present embodiment. Accordingly, information of 1 of the first key data 9C is allocated to the first key 50a and, for "kana" input, an image representing "あ row" (a row) is displayed on the first key 50a.

The second key area 42 is provided along the side 2D of the touch screen display 2 and is adjacent to the side 2D. In other words, the second key area 42 is adjacent to the side face 1C3 of the housing 20. The second key area 42 is arranged on a side different from the side of the first key area 40, i.e., the side facing the side of the first key area 40 in the present embodiment. In the second key area 42, multiple second keys 52a, 52b, 52c, 52d, 52e, 52f, 52g, 52h, 52i and 52j are displayed. The second keys 52a, 52b, 52c, 52d, 52e, 52f, 52g, 52h, 52i and 52j are sequentially arranged along the side 2D from the top side of the screen to the bottom side. Each of the contents of 1 to 10 of the second key data 9D are allocated to each of the second keys 52a, 52b, 52c, 52d, 52e, 52f, 52g, 52h, 52i and 52j according to the present embodiment. Accordingly, 1 of the second key data 9D is allocated to the second key 52a and, for "kana" input and when "あ row" (a row) of the first key 50a is chosen, an image representing "あ" (a) is displayed on the second key 52a.

In the following descriptions, the first keys 50a, 50b, 50c, 50d, 50e, 50f, 50g, 50h, 50i and 50j will be referred to as first keys 50 when they are not distinguished from one another. The second keys 52a, 52b, 52c, 52d, 52e, 52f, 52g, 52h, 52i and 52j will be referred to as second keys 52 when they are not distinguished from one another.

In the state notifying field 44, a character that is chosen as a possible input is displayed. The end key 46 is a key to which an ending operation for the text input is allocated. The input text display field 48 is a field in which the input character is displayed. In FIG. 10, an input character array "ありがとう" (arigatou) is displayed. The character array in FIG. 10 is an example only. The determination key 49 is a key to which an operation of determining a character that is a possible input as a character to be input is allocated. The determination key 49 is adjacent to both the side 2C and 2D. The determination key 49 is adjacent to both the first key area 40 and the second key area 42. The position in which the determination key 49 is arranged is not limited thereto.

The smartphone 1 makes a sound output of a character that is a possible input or a character array that is input, i.e., a text/a character array that is displayed on the input text display field 48 in the present embodiment. According to the sound output, the user can check a character that is chosen or a character that is input even in a situation where it is not possible to check the display of the screen. The sound output of the character that is a possible input may be made every time when the character that is a possible input changes or alternatively may be made when a rule that is set is satisfied or an operation that is set is executed.

In the present embodiment, the images of the first keys 50 and the second keys 52 are displayed on the display 2A; however, the embodiments are not limited thereto. In the smartphone 1, it is satisfactory if key inputs are allocated to positions corresponding to the first key area 40 and the second key area 42 in the smartphone 1, and no image may be displayed. In other words, it is satisfactory if, when the touch screen 2B detects an input in each area, the input is detected as a key input by allocating each of the first key area 40, the first keys 50, the second key area 42 and the second keys 52 to each area in the touchscreen 2B. Thus, the electronic device may enable character input in a state where no image is displayed on the display 2A, or the electronic device need not have the display 2A. It is preferable that, in a case where no image is displayed, the electronic device makes the above-described sound output when the key operation is detected.

With respect to the present embodiment, the case where the contents of the first key data 9C are allocated to the first keys 50 and the contents of the second key data 9D are allocated to the second keys 52 in the smartphone 1 has been described; however, the embodiments are not limited thereto. For example, in the smartphone 1, the contents of the first key data 9C may be allocated to the second keys 52 and the contents of the second key data 9D may be allocated to the first keys 50.

With respect to the present embodiment, the case where the smartphone 1 uses ten keys for the first keys 50 and uses ten keys for the second keys 52 will be described; however, the embodiments are not limited thereto. For example, more than 10 keys or less than 10 keys may be used for the first keys 50 and more than 10 keys or less than 10 keys may be used for the second keys 52 in the smartphone 1. Furthermore, the amount of keys for the first keys 50 may be different from that for the second keys 52.

With reference to FIGS. 11 to 12, an exemplary character editing process performed by the smartphone 1 will be described. The character editing process includes a process of allocating characters or character arrays to be edited to multiple keys and a process of editing the characters allocated to the keys. With respect to the present embodiment, a case where the character editing process is implemented by executing the input program 9B will be described; however, the embodiments are not limited thereto. For example, the character editing process may be provided as an editing program independently of the input program 9B.

FIG. 11 is a diagram illustrating exemplary document data. As illustrated in FIG. 11, the document data 9F contains, for example, information representing a document consisting of multiple lines. The document contains multiple character arrays. The smartphone 1 is able to edit, for example, the document data 9F that is specified by the user or a character array that are input to the input text display field 48.

In the example illustrated in FIG. 11, the document data 9F contains information representing a Japanese document consisting of nine lines. The document data 9F contains a character array "また後日お会いできることを" (mata gojitsu oai dekiru koto wo) as the first line. The document data 9F contains a character array "心待ちにしております" (kokoromachi ni shite orimasu) as the second line. The document data 9F contains a character array "ところで、ご質問いただい", (tokorode goshitsumon itadai) as the third line. The document data 9F contains a character array "ていた例の件ですが、もう" (teita reino ken desuga, mou) as the fourth line. The document data 9F contains a character array "少し回答にお時間にいただ" (sukoshi kaitou ni ojikan itada) as the fifth line. The document data 9F contains a character array "けませんでしょうか？" (kemasendeshouka?) as the sixth line. The document data 9F contains a character array "お手数おかけして大変申" (otesuu okakeshite taihen mou) as the seventh line. The document data 9F contains a character array "し訳ありませんが、何卒宜" (shiwake arimasenga, nanitozo yoro) as the eighth line. The document data 9F contains a character array "しくお願いいたします" (shiku onegai itashimasu) as the ninth line. In the document data 9F, the first to ninth character arrays are linked into one document.

By executing the character editing process of the input program 9B, the smartphone 1 is able to allocate characters or character arrays to be edited to the first keys 50 or the second keys 52. The smartphone 1 is able to allocate characters or character arrays to be edited to the first keys 50 or the second keys 52 in multiple allocation patterns. For example, when Japanese is to be edited, the multiple allocation patterns include allocation patterns of hiragana character, single character, single word, phrases, single sentence and punctuation marks. The hiragana allocation pattern includes an allocation pattern for converting characters or character arrays to be edited into hiragana characters and allocating each hiragana character to the first key 50 or the second key 52. The single character allocation pattern includes an allocation pattern for, regardless of the character type, sequentially allocating characters or character arrays to be edited to the first keys 50 or the second keys 52. The single word allocation pattern includes an allocation pattern for allocating character arrays to be edited to the first keys 50 or the second keys 52 in a minimum unit of language with a meaning and a function grammatically. The single line allocation pattern includes an allocation pattern for allocating each line of a document to be edited to the first key 50 or the second key 52. The punctuation mark allocation pattern includes an allocation pattern for allocating character arrays to be edited to the first keys 50 or the second keys 52 in a unit according to punctuation marks.

FIG. 12 is a table illustrating allocation of characters or character arrays to the first keys 50. The example illustrated in FIG. 12 represents an exemplary case where a user uses the smartphone 1 horizontally. The example illustrated in FIG. 12 represents an exemplary case where the document data 9F illustrated in FIG. 11 is edited. In the example illustrated in FIG. 12, the smartphone 1 allocates functions, selective by the user, of backwarding to the previous key group and forwarding to the next key group to the first keys 50*j* and 50*a* among the ten first keys 50; however, the embodiments are not limited thereto. The smartphone 1 uses, for example, all the ten first keys 50 as keys to which characters or character arrays are to be allocated.

A pattern P1 represents an allocation pattern for "hiragana character". For example, when the user chooses the hiragana allocation pattern, the smartphone 1 converts kanji characters in the document data 9F into hiragana characters. For example, the smartphone 1 sequentially allocates the multiple hiragana characters to the first keys 50*i*, 50*h*, 50*g*, 50*f*, 50*e*, 50*d*, 50*c* and 50*b*, respectively. For example, when the document data 9F contains more than eight hiragana characters, the smartphone 1 is able to sequentially allocate the 9th and the following hiragana characters repeatedly to the first keys 50*i*, 50*h*, 50*g*, 50*f*, 50*e*, 50*d*, 50*c* and 50*b*, respectively.

A pattern P2 represents an allocation pattern for "single character". For example, the smartphone 1 sequentially allocates the multiple characters in the document data 9F to the first keys 50*i*, 50*h*, 50*g*, 50*f*, 50*e*, 50*d*, 50*c* and 50*b*, respectively. For example, when the document data 9F contains more than eight characters, the smartphone 1 is able to sequentially allocate the 9th and the following characters repeatedly to the first keys 50*i*, 50*h*, 50*g*, 50*f*, 50*e*, 50*d*, 50*c* and 50*b*, respectively.

A pattern P3 represents an allocation pattern according to each "word". For example, the smartphone 1 sequentially allocates the multiple words/phrases in the document data 9F to the first keys 50*i*, 50*h*, 50*g*, 50*f*, 50*e*, 50*d*, 50*c* and 50*b*, respectively. For example, when the document data 9F contains more than eight words/phrases, the smartphone 1 is able to sequentially allocate the 9th and the following words/phrases repeatedly to the first keys 50*i*, 50*h*, 50*g*, 50*f*, 50*e*, 50*d*, 50*c* and 50*b*, respectively. The example illustrated in FIG. 12 describes the case where the smartphone 1 converts the document data 9F into hiragana characters and sections the characters into words/phrases; however, the embodiments are not limited thereto. For example, the smartphone 1 may, without converting the document data 9F into hiragana characters, section words/phrases based on the character arrays in which hiragana characters and kanji characters are mixed.

A pattern 4 represents an allocation pattern according to each "line". For example, the smartphone 1 sequentially allocates the character arrays of the first to eighth lines in the document data 9F to the first keys 50*i*, 50*h*, 50*g*, 50*f*, 50*e*, 50*d*, 50*c* and 50*b*, respectively. For example, when the document data 9F contains characters in more than eight lines, the smartphone 1 is able to sequentially allocate the 9th and the following word arrays repeatedly to the first keys 50*i*, 50*h*, 50*g*, 50*f*, 50*e*, 50*d*, 50*c* and 50*b*, respectively.

In the example illustrated in FIG. 12, the smartphone 1 allocates, as the pattern P1, the hiragana characters "ま" (ma), "た" (ta), "ご" (go), "じ" (ji), "つ" (tsu), "お" (o), "あ" (a) and "い" (i) to the first keys 50*i*, 50*h*, 50*g*, 50*f*, 50*e*, 50*d*, 50*c* and 50*b*, respectively.

In the example illustrated in FIG. 12, the smartphone 1 allocates, as the pattern P2, the characters "ま" (ma), "た" (ta), "後" (go), "日" (jitsu), "ま" (o), "会" (a), "い" (i) and "で" (de) in the document data 9F to the first keys 50*i*, 50*h*, 50*g*, 50*f*, 50*e*, 50*d*, 50*c* and 50*b*, respectively.

In the example illustrated in FIG. 12, the smartphone 1 allocates, as the pattern P3, the words/phrases "また" (mata), "ごじつ" (goitsu), "おあい" (oai), "できる" (dekiru), "こと" (koto), "を" (wo) "こころまち" (kokoromachi) and "に" (ni) in the document data 9F to the first keys 50*i*, 50*h*, 50*g*, 50*f*, 50*e*, 50*d*, 50*c* and 50*b*, respectively. With respect to the present embodiment, the case where words/phrases are allocated in hiragana characters is described; however, the embodiments are not limited thereto. For example, the smartphone 1 may section the document containing kanji characters and hiragana characters into words/phrases without converting the kanji characters in the document data 9F into hiragana characters.

In the example illustrated in FIG. 12, the smartphone 1 allocates, as the pattern P4, the character arrays of the first to eighth lines in the document data 9F to the first keys 50*i*, 50*h*, 50*g*, 50*f*, 50*e*, 50*d*, 50*c* and 50*b*, respectively.

With respect to the present embodiment, the case where the smartphone 1 displays a horizontal editing screen has been described since the document data 9F is a horizontal writing; however, the embodiments are not limited thereto. For example, the smartphone 1 may display a vertical editing screen even when the document data 9F is horizontal writing.

The exemplary character editing process performed by the smartphone 1 will be described with reference to FIGS. 13 to 26. FIGS. 13 to 26 are diagrams illustrating exemplary display screens according to the character editing process. For example, when executing the Japanese character editing process by using the input program 9B, the smartphone 1 displays the editing screens illustrated in FIGS. 13 to 26 on the touch screen display 2. Each of the editing screens illustrated in FIGS. 13 to 26 contains the first key area 40, the second key area 42, the state notifying field 44, an editing field 45, the end key 46 and the determination key 49. The buttons 3A to 3C may be used for a fixing operation on the first keys 50 and the second keys 52. The smartphone 1 may use part of the first key area 40 and the second key area 42 for the fixing operation. For example, the smartphone 1 may use a key to which no character is allocated in the first key area 40 for the fixing operation.

The editing field 45 contains a field in which, for example, a document or characters to be edited are displayed. The editing field 45 is provided between the first key area 40 and the second key area 42. For example, when the touch screen display 2 is horizontal, the second key area 42 is arranged above the editing field 45 and the first key area 40 is arranged below the editing field 45. For example, when the touch screen display 2 is vertical, the first key area 40 is arranged on the right of the editing field 45 and the second key area 42 is arranged on the left of the editing field 45.

Figure 13:
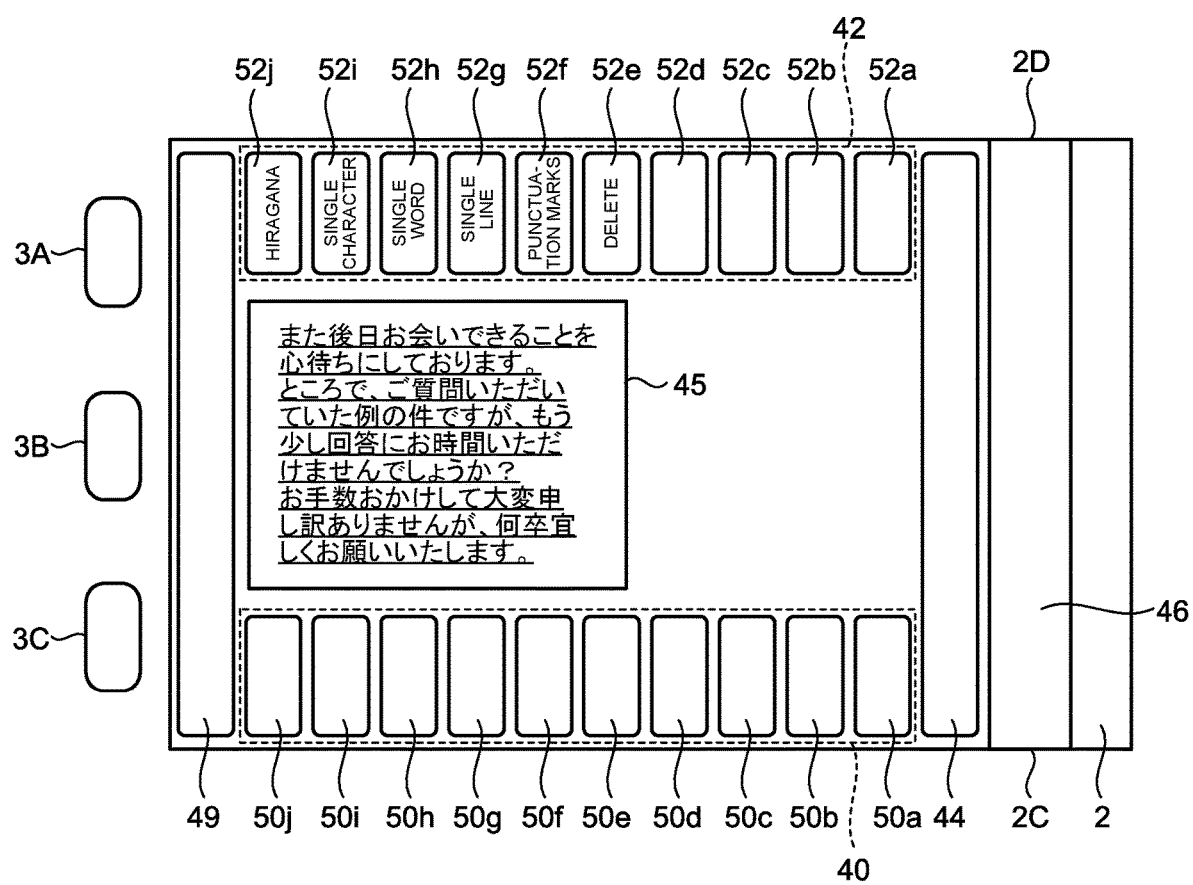
FIG. 13 is a diagram illustrating an exemplary display screen according to a character editing process.

When editing the characters in the document data 9F is requested, the smartphone 1 displays the editing screen illustrated in FIG. 13 on the touch screen display 2. The smartphone 1 displays information representing the document in the document data 9F on the editing field 45. In the example illustrated in FIG. 13, the smartphone 1 displays images which represent types of allocation patterns on the second keys 52*j*, 52*i*, 52*h*, 52*g* and 52*f* on the editing screen, respectively. The smartphone 1 allocates a character deletion function to the second key 52*e* and displays the image representing "delete" on the second key 52*e*. In the case illustrated in FIG. 13, the allocation pattern has not been fixed and thus the smartphone 1 does not allocate characters or character arrays to the first keys 50.

Figure 14:
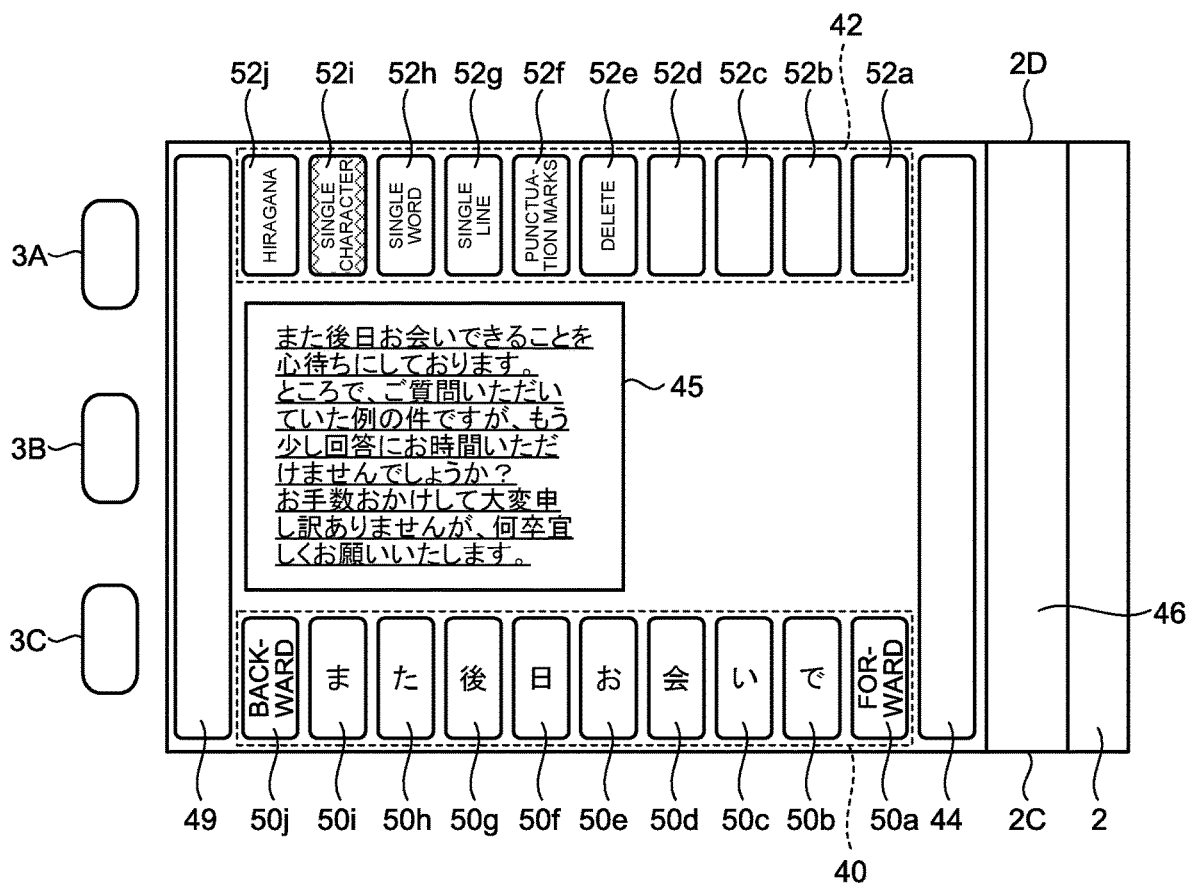
FIG. 14 is a diagram illustrating an exemplary display screen according to the character editing process.

As illustrated in FIG. 14, the user performs a choosing operation, such as long touch, tap or double tap, on the second key 52*i* corresponding to "single character". The choosing operation, for example, includes an operation on the determination key 49 or any one of the buttons 3A to 3C in a state where the second key 52*i* is provisionally chosen. After detecting the choosing operation on the second key 52*i* via the touch screen 2B, the smartphone 1 changes the second key 52*i* on the editing screen to a chosen state. In this case, the smartphone 1 may output sound of, for example, "Reading by single character is set." from the speaker 11. By executing the character editing process, the smartphone 1 allocates the document data 9F to the first keys 50 according to the single character allocation pattern corresponding to the chosen second key 52*i*.

In the example illustrated in FIG. 14, the smartphone 1 displays images representing "ま" (ma), "た" (ta), "後" (go), "日" (jitsu), "お" (o), "会" (a), "い" (i) and "で" (de) in the document data 9F on the first keys 50*i*, 50*h*, 50*g*, 50*f*, 50*e*, 50*d*, 50*c* and 50*b*, respectively. The smartphone 1 displays images representing "previous" and "next" on the first keys 50*j* and 50*a*, respectively. When the first keys 50*j* representing "previous" is chosen, the smartphone 1 is able to newly allocate a character group previous to the allocated character group to the first keys 50*i*, 50*h*, 50*g*, 50*f*, 50*e*, 50*d*, 50*c* and 50*b*. When the first key 50*a* representing "next" is chosen, the smartphone 1 is able to newly allocate a character group next to the allocated character group to the first keys 50*i*, 50*h*, 50*g*, 50*f*, 50*e*, 50*d*, 50*c* and 50*b*. For example, when there is no character group before and after the character group being displayed, the smartphone 1 need not allocate the functions to the first keys 50*j* and 50*a* or may make a notification indicating that there is no character group.

Figure 15:
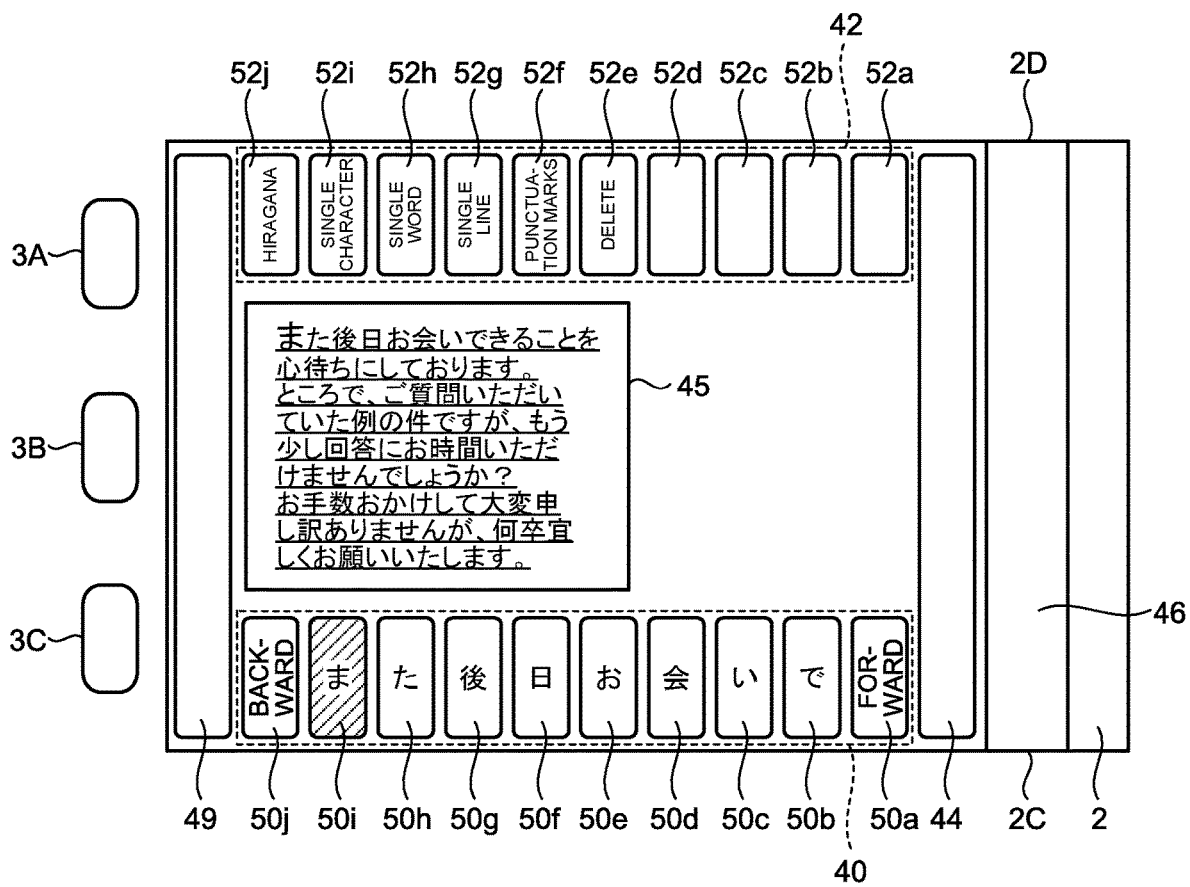
FIG. 15 is a diagram illustrating an exemplary display screen according to the character editing process.

As illustrated in FIG. 15, the user performs a provisionally choosing operation on the first key 50*i* by, for example, a finger. The provisionally choosing operation includes an operation, such as touch. After detecting the provisionally choosing operation on the first key 50*i* via the touch screen 2B, the smartphone 1 changes the first key 50*i* on the screen illustrated in FIG. 15 to a provisionally chosen state. The smartphone 1 outputs the sound of "ま" (ma) corresponding to the first key 50*i* from the speaker 11 by performing a reading process. The reading process includes, for example, a process of converting data to be read into sound. The data to be converted into sound includes a character and a character array. Similarly, when the user sequentially touches the first keys 50*h* and 50*g*, the smartphone 1 outputs the sound of "た" (ta) and "後" (go) from the speaker 11. When a character is a kanji character, the smartphone 1 is able to read the character and make a sound output of an example using the character for a word. For example, when a character is a kanji character "後" (go), the smartphone 1 is able to read as "ご, . . . kou of 後半" (go, . . . kou of kouhan).

Thus, when editing characters or character arrays to be edited, the smartphone 1 is able to allocate the characters or character arrays to be edited to the given first keys 50 according to the allocation pattern that is specified by the user. The smartphone 1 is able to notify the user of the characters or the character arrays allocated to the first keys 50 by sound. As a result, the user is able to check the characters to be edited and the sequence of the characters by contacting the first keys 50 arranged along the periphery of the touch screen 2B and thus is able to find the editing position in the editing field 45 easily. By operating the first keys 50, the user is able to read characters at his/her own pace or read the characters from a desired character and thus efficiency of checking the editing position is increased. Accordingly, the smartphone 1 is able to improve operability for searching for a part that the user wants to edit in the document data 9F. The smartphone 1 is able to reduce possibility that the user takes a wrong part to be edited in the document data 9F.

Figure 16:
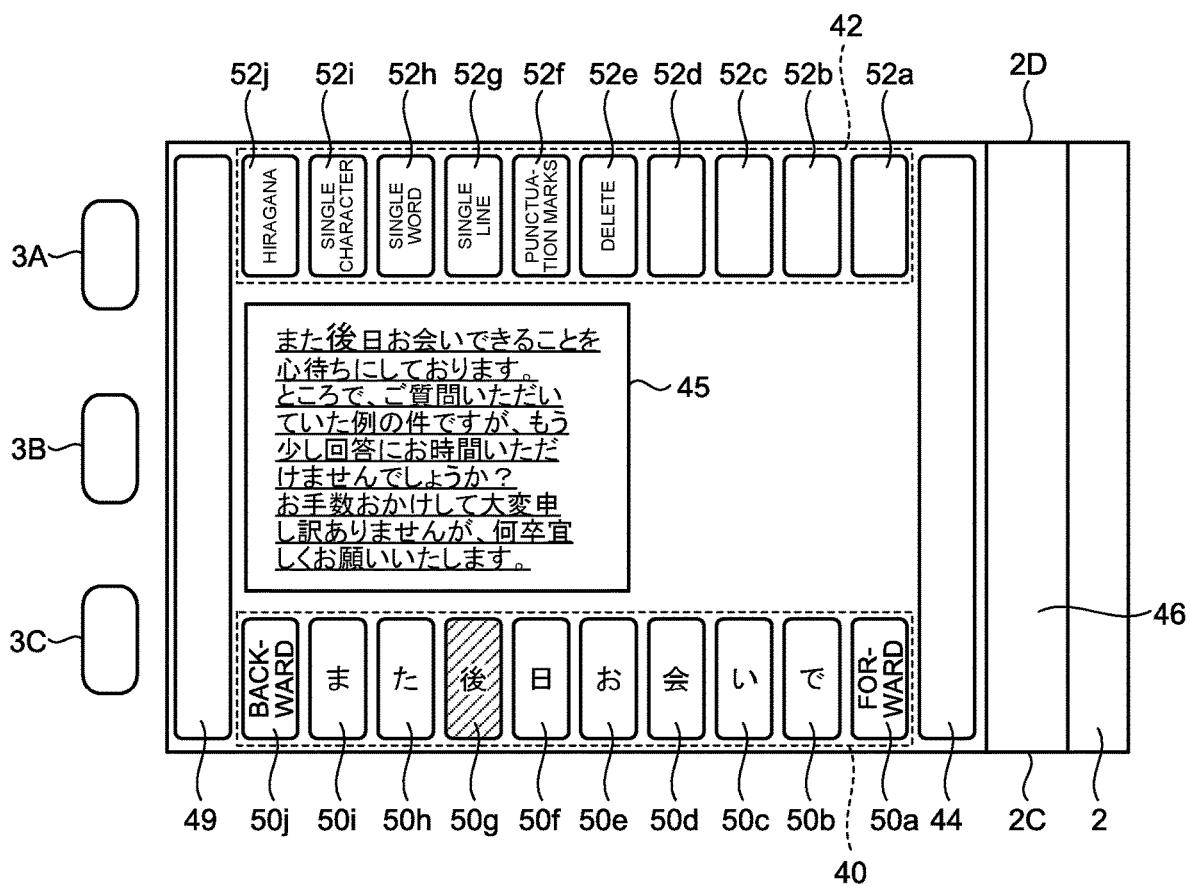
FIG. 16 is a diagram illustrating an exemplary display screen according to the character editing process.

As illustrated in FIG. 16, when the user corrects the character "後" (go), the user performs a choosing operation on the first key 50*g*. The smartphone 1 changes the first key 50*g* to the chosen state after detecting the choosing operation on the first key 50*g* via the touch screen 2B. The smartphone 1 accepts editing the chosen character, i.e., enables the editing function. In this case, the smartphone 1 may display the character "後" (go) displayed in the editing field 45 and corresponding to the first key 50*g* in a display manner different from that of other characters. In the example illustrated in FIG. 16, the smartphone 1 displays the character "後" (go) in a size larger than that of other characters to be enhanced. For example, the smartphone 1 may display a cursor on "後" (go). After accepting the editing, the smartphone 1 allocates display images for performing Japanese "kana" input to the second keys 52.

Figure 17:
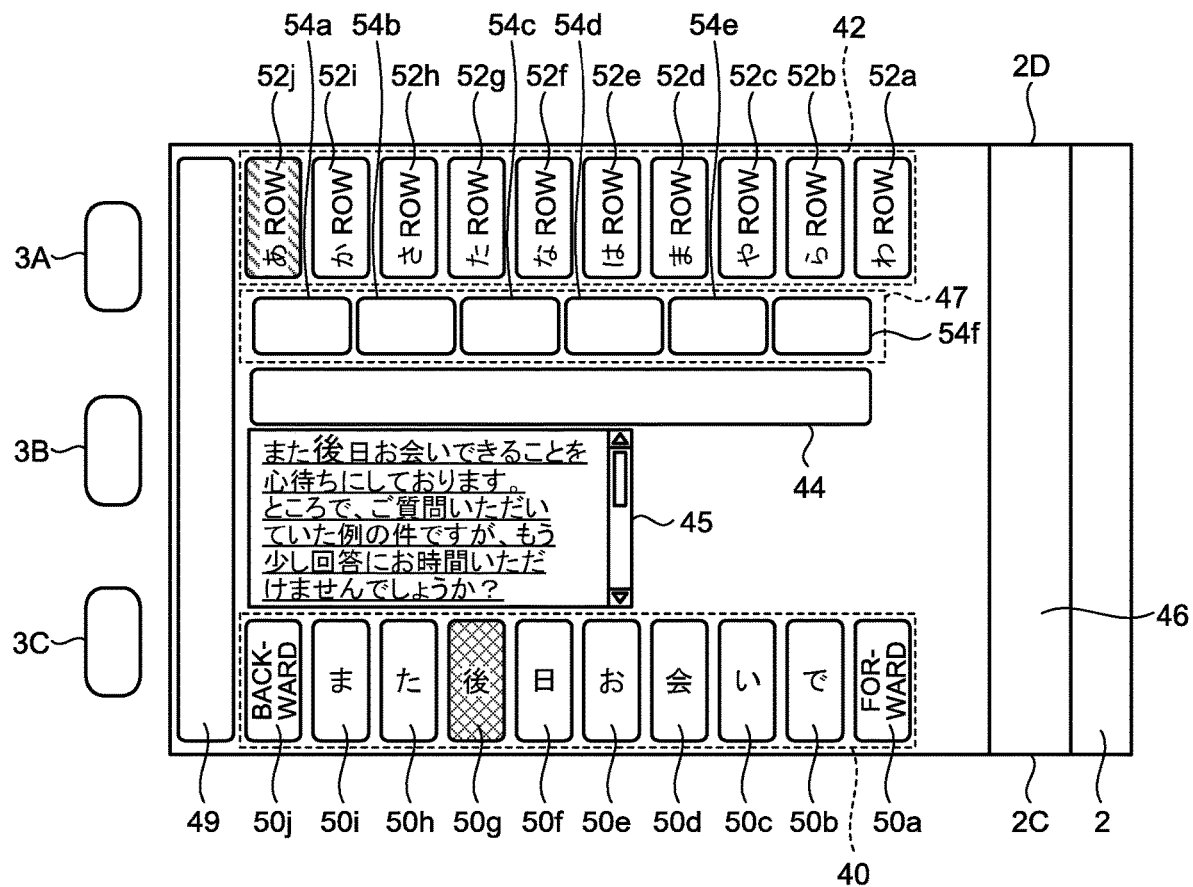
FIG. 17 is a diagram illustrating an exemplary display screen according to the character editing process.

As illustrated in FIG. 17, the smartphone 1 displays display images of "あ row" (a row), "か row" (ka row), "さ row" (sa row), "た row" (ta row), "な row" (na row), "は row" (ha row), "ま row" (ma row), "や row" (ya row), "ら row" (ra row) and "わ row" (wa row) for character input on the second keys 52j, 52i, 52h, 52g, 52f, 52e, 52d, 52c, 52b and 52a, respectively. The smartphone 1 further displays a third key area 47 on the editing screen illustrated in FIG. 17. The third key area 47 includes an area in which multiple software keys are displayed. The third key area 47 is provided in a position where the third key area 47 overlaps the touch screen 2B. The third key area 47 is provided along the second key area 42. In other words, the third key area 47 is provided along the periphery of the touch screen 2B. In the third key area 47, multiple third keys 54a, 54b, 54c, 54d, 54e and 54f are displayed. The third keys 54a, 54b, 54c, 54d, 54e and 54f of the present embodiment are sequentially arranged from the left of the screen to the right along the second key area 42. The smartphone 1 displays the state notifying field 44 and the third key area 47 between the second key area 42 and the editing field 45 on the editing screen, which reduces the display size of the editing field 45 and thus enables scrolling. In the following descriptions, the third keys 54a, 54b, 54c, 54d, 54e and 54f will be referred to as third keys 54 when they are not distinguished from one another.

With respect to the present embodiment, the exemplary smartphone 1 in which the third key area 47 is provided along the second key area 42 will be described; however, the embodiments are not limited thereto. For example, in the smartphone 1, the third key area 47 may be provided along the first key area 40. With respect to the present embodiment, the exemplary smartphone 1 in which the state notifying field 44 and the editing field 45 are provided on the editing screen including the third key area 47 will be described; however, the embodiments are not limited thereto. For example, in the smartphone 1, the state notifying field 44 and the editing field 45 need not be provided on the editing screen including the third key area 47. For example, in the smartphone 1, the state notifying field 44 or the editing field 45 may be provided on the editing screen including the third key area 47. For example, when the state notifying field 44 and the editing field 45 are not provided on editing screen of the smartphone 1, the third key area 47 may be provided along the second key area 42 and the first key area 40.

Figure 18:
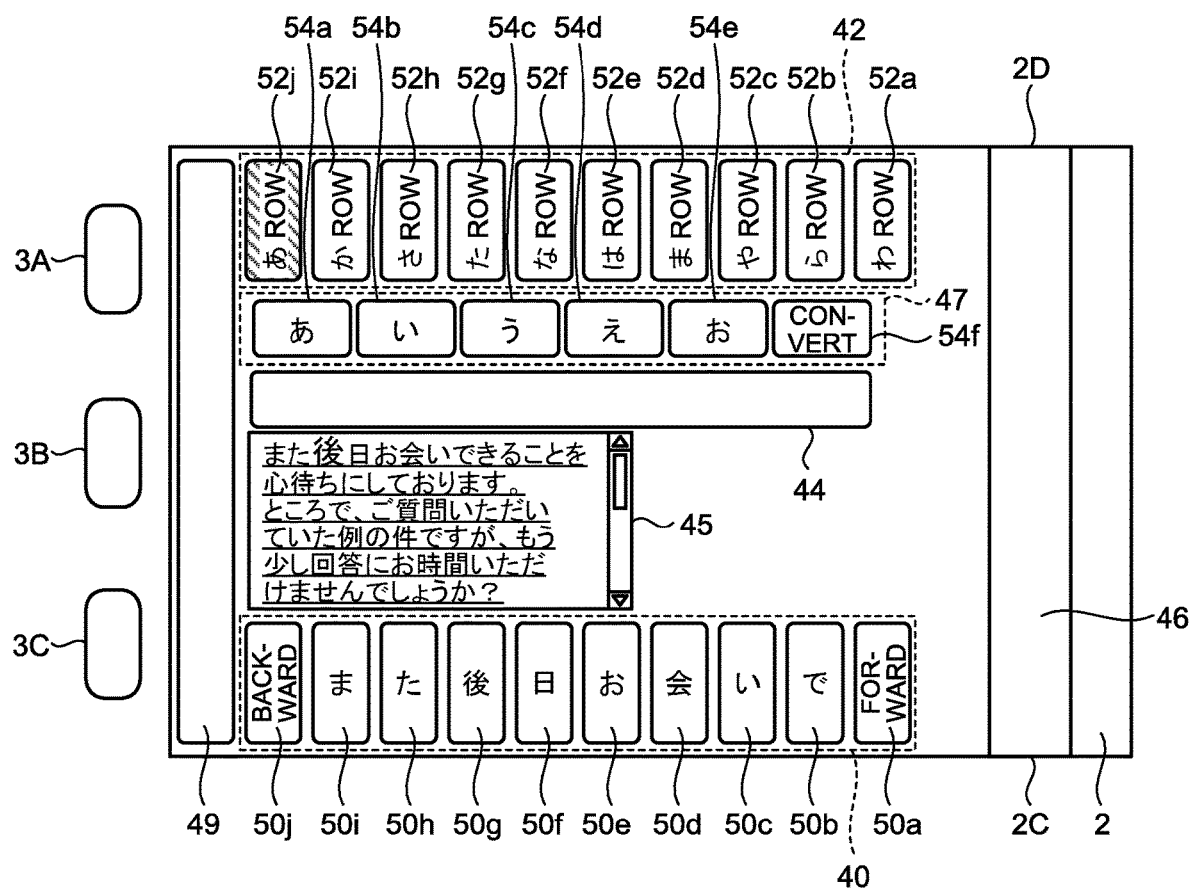
FIG. 18 is a diagram illustrating an exemplary display screen according to the character editing process.

As illustrated in FIG. 18, the user performs the provisionally choosing operation on the second key 52j. After detecting the provisionally choosing operation on the second key 52j via the touch screen 2B, the smartphone 1 changes the second key 52j to the provisionally chosen state. The smartphone 1 allocates possible inputs corresponding to " あ row" (a row) and a conversion key to the third keys 54a, 54b, 54c, 54d, 54e and 54f. In the example illustrated in FIG. 18, the smartphone 1 displays images representing "あ" (a), "い" (i), "う" (u), "え" (e), "お" (o), and "convert" on the third keys 54a, 54b, 54c, 54d, 54e and 54f, respectively.

Figure 19:
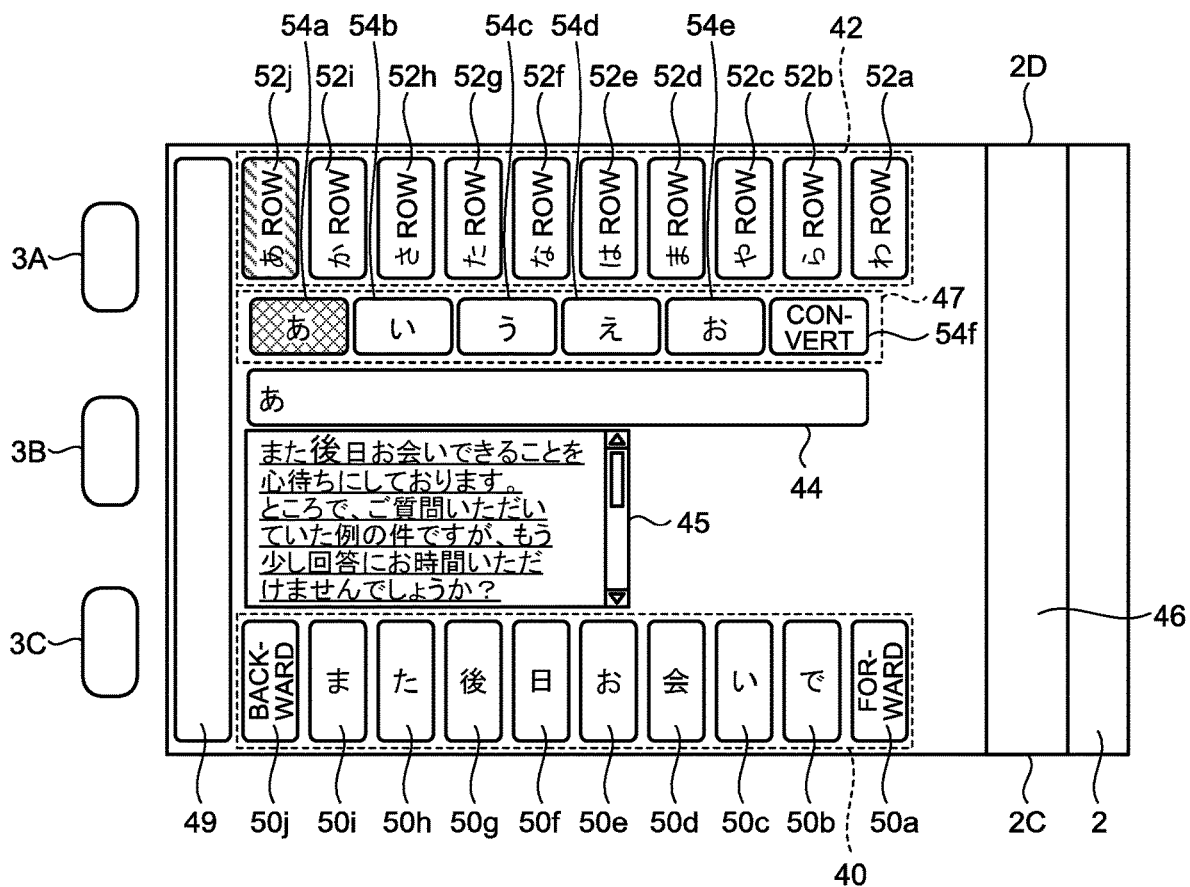
FIG. 19 is a diagram illustrating an exemplary display screen according to the character editing process.

As illustrated in FIG. 19, the user performs the choosing operation on the third key 54a to which the character "あ" (a) is allocated. After detecting the choosing operation on the third key 54a via the touch screen 2B, the smartphone 1 accepts an input of a character corresponding to the third key 54a and changes the third key 54a to the chosen state. The smartphone 1 displays the chosen character on the state notifying field 44 on the screen. In the example illustrated in FIG. 19, the smartphone 1 displays the character "あ" (a) corresponding to the chosen third key 54a in the state notifying field 44.

Figure 20:
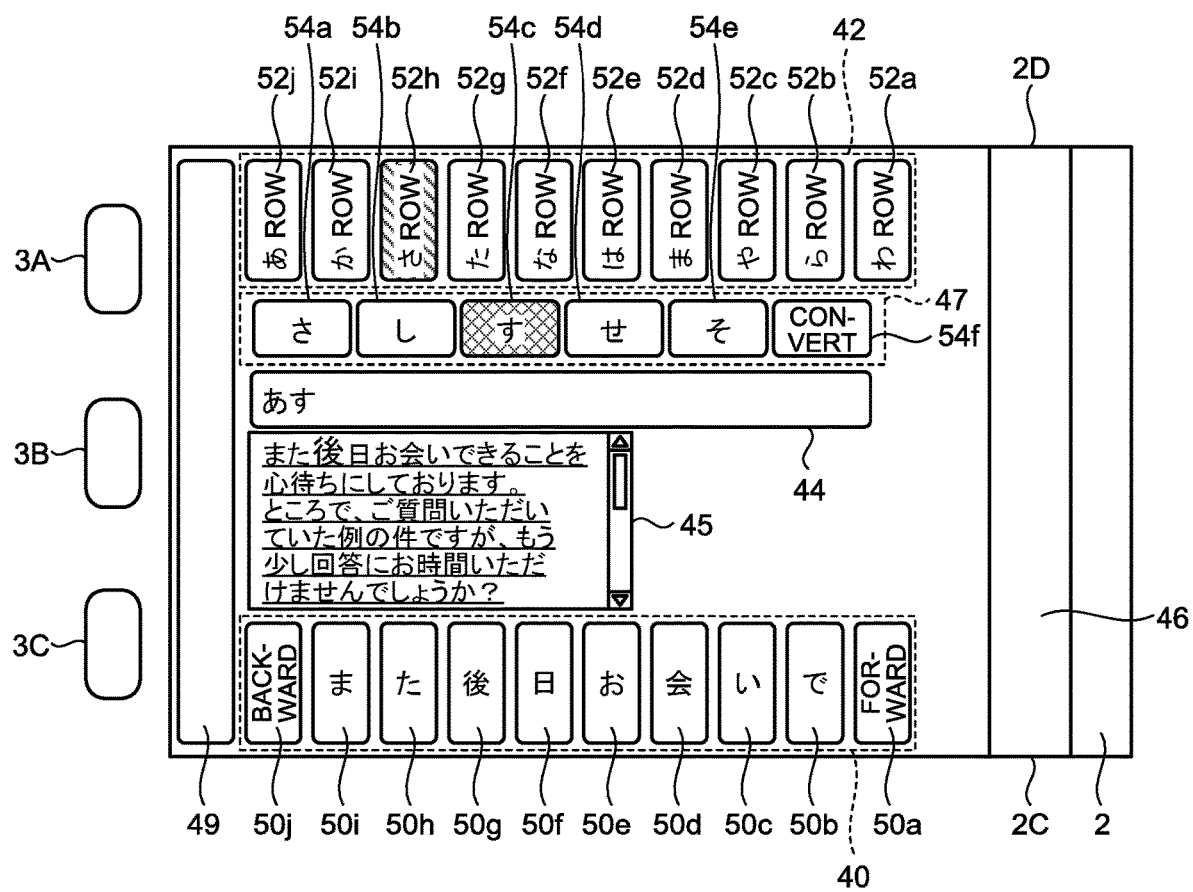
FIG. 20 is a diagram illustrating an exemplary display screen according to the character editing process.

As illustrated in FIG. 20, the user performs the provisionally choosing operation on the second key 52h to which "さ row" (sa row) is allocated and performs the choosing operation on the third key 54c to which "す" (su) is allocated. After detecting the provisionally choosing operation on the second key 52h via the touch screen 2B, the smartphone 1 changes the second key 52h to the provisionally chosen state. In this case, the smartphone 1 allocates possible inputs corresponding to "さ row" (sa row) and the conversion key to the third keys 54a, 54b, 54c, 54d, 54e and 54f, respectively. After detecting the choosing operation on the third key 54c, the smartphone 1 accepts an input of the character corresponding to the third key 54c and changes the third key 54c to the chosen state. In the example illustrated in FIG. 20, the smartphone 1 additionally displays the character "す" (su) in the state notifying field 44. In other words, the smartphone 1 displays the hiragana character array "あす" (asu) in the state notifying field 44.

Figure 21:
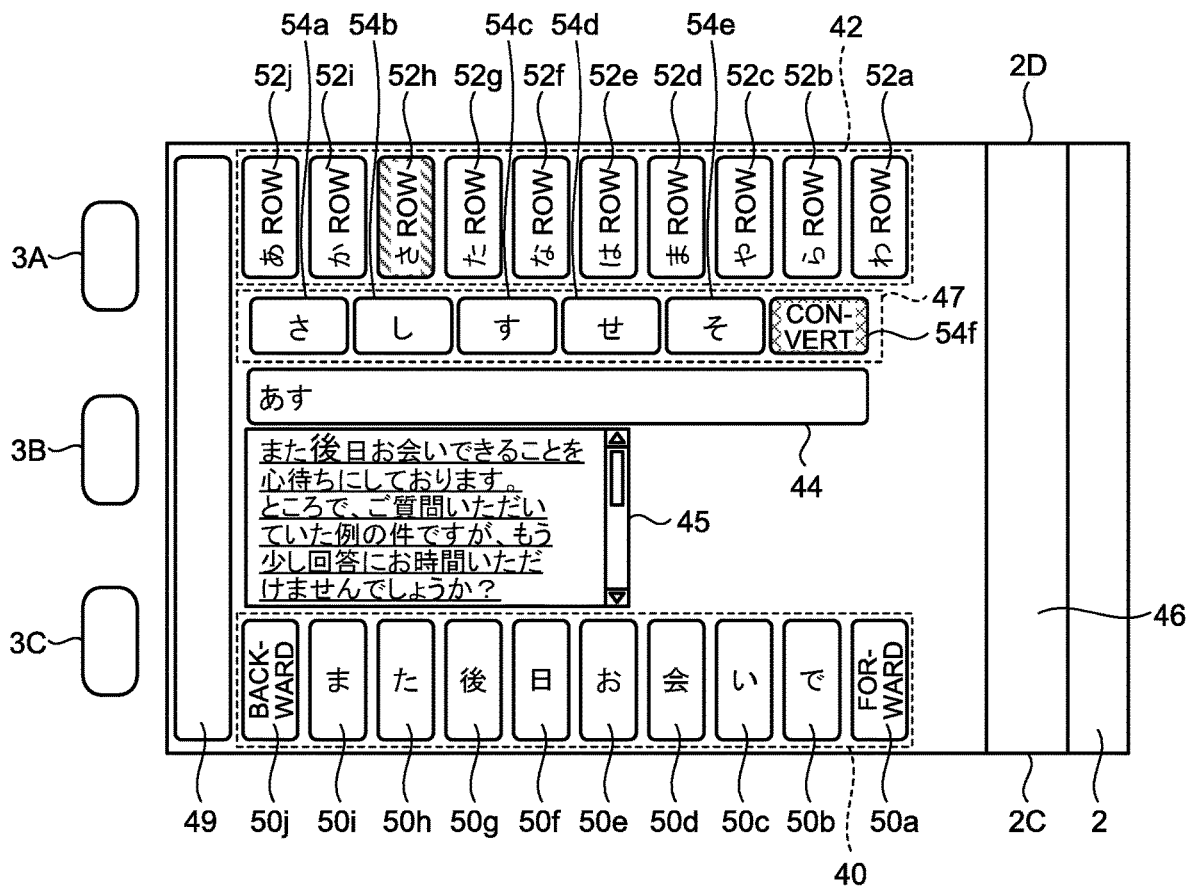
FIG. 21 is a diagram illustrating an exemplary display screen according to the character editing process.

As illustrated in FIG. 21, the user performs the choosing operation on the third key 54f representing "convert" to convert the input characters. The smartphone 1 changes the third key 54f to the chosen state after detecting the choosing operation on the third key 54f via the touch screen 2B. In this case, the smartphone 1 acquires possible conversions of the characters or the character array displayed in the state notifying field 44. For example, the smartphone 1 acquires the possible conversions corresponding to the characters or the character array from, for example, dictionary data or a server.

Figure 22:
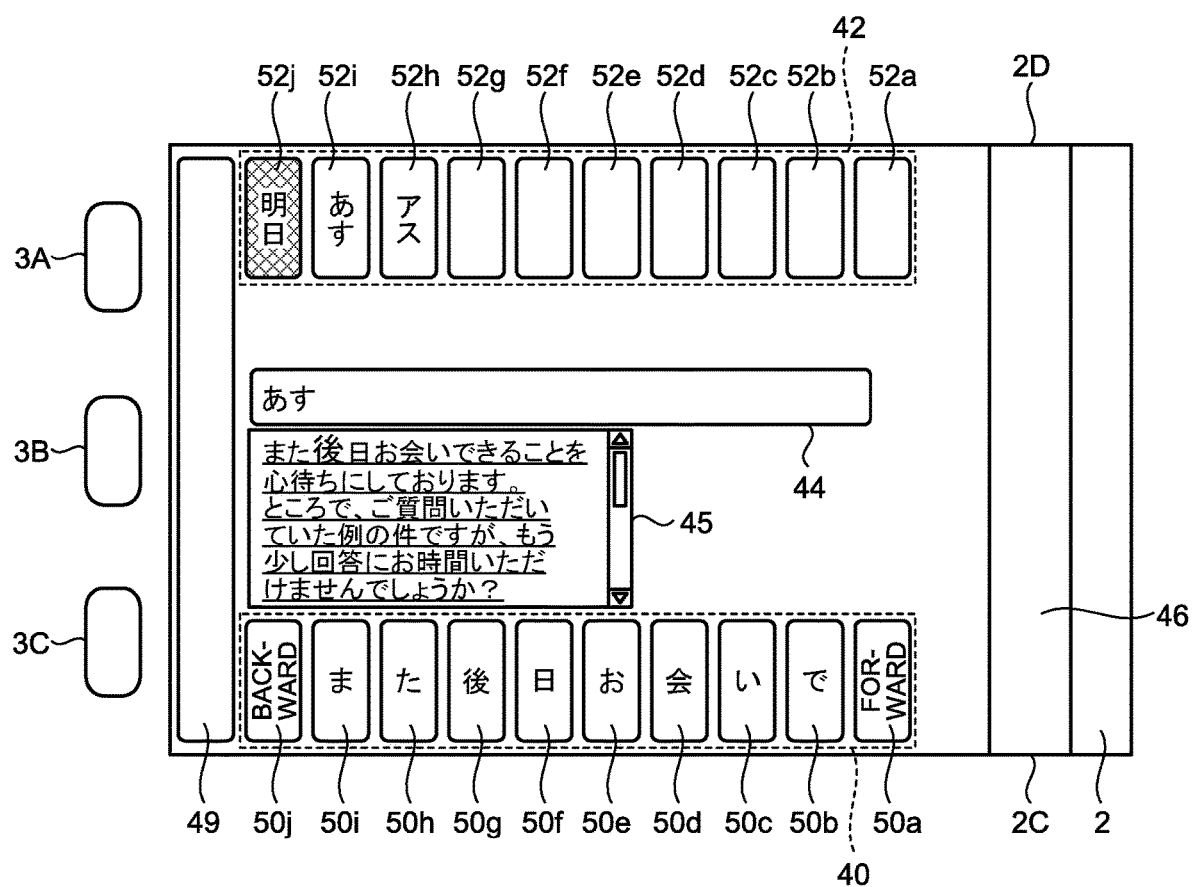
FIG. 22 is a diagram illustrating an exemplary display screen according to the character editing process.

As illustrated in FIG. 22, after specifying possible conversions of the characters or the character array, the smartphone 1 allocates the possible conversions to the second keys 52. The smartphone 1 displays images of the allocated possible conversions on the second keys 52. In the example illustrated in FIG. 22, the smartphone 1 acquires possible conversions of "明日" (asu), "あす" (asu) and "アス" (asu) as the possible conversions of the characters "あす" (asu). The smartphone 1 displays images of "明日" (asu), "あす" (asu) and "アス" (asu) that are the possible conversions on the second keys 52j, 52i and 52h, respectively. With respect to the present embodiment, the case where, when displaying the possible conversions on the second keys 52, the smartphone 1 clears the third key area 47 in the editing screen illustrated in FIG. 22 will be described; however, the embodiments are not limited thereto. For example, the smartphone 1 may display the third key area 47 containing the multiple third keys 54 on which no image is displayed on the editing screen illustrated in FIG. 22.

In the example illustrated in FIG. 22, the user performs the choosing operation on the second key 52j representing "明日" (asu). The smartphone 1 changes the second key 52j to the chosen state after detecting the choosing operation on the second key 52j via the touch screen 2B. In this case, the smartphone 1 fixes the editing of the character allocated to the first key 50g. In the example illustrated in FIG. 22, the smartphone 1 fixes the editing of "後" (go) allocated to the first key 50g into the characters "明日" (asu). In this case, the smartphone 1 may display the fixed characters "明日" (asu) in the state notifying field 44.

Figure 23:
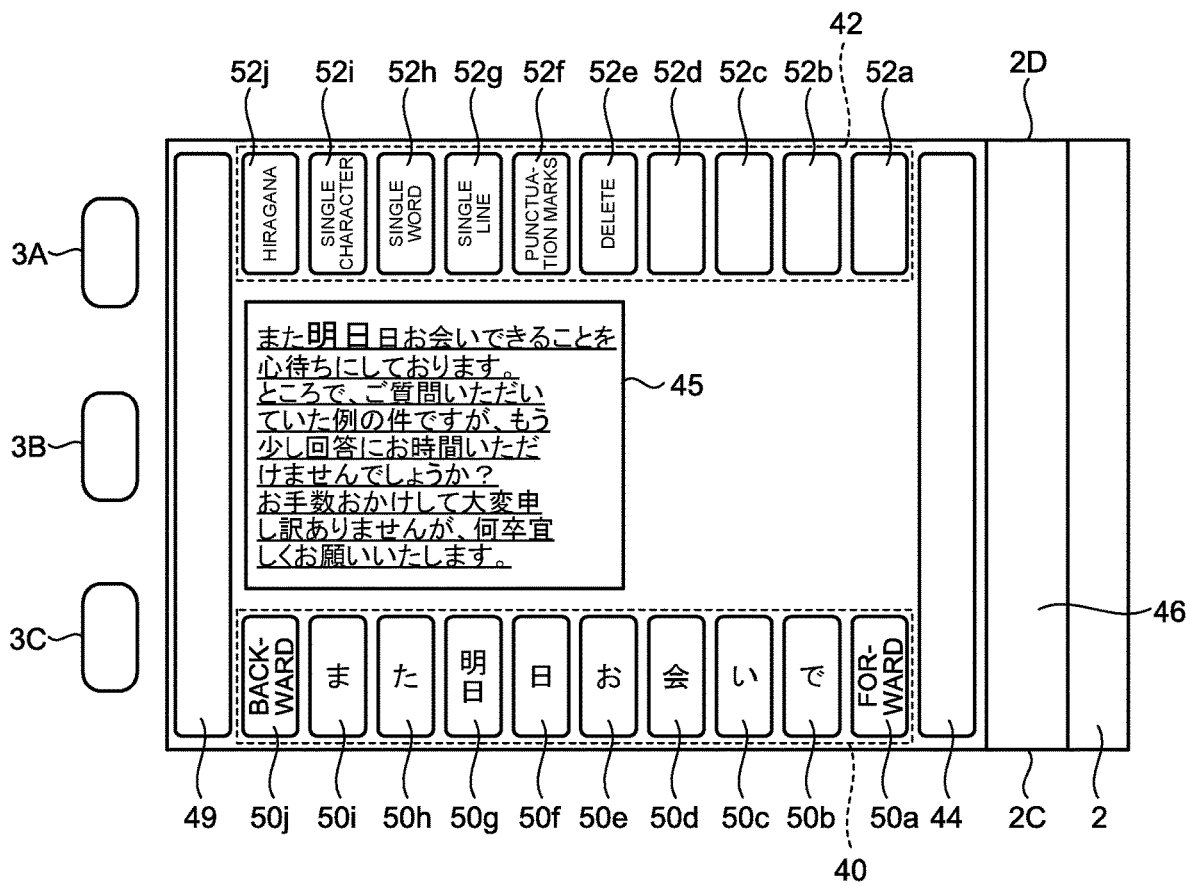
FIG. 23 is a diagram illustrating an exemplary display screen according to the character editing process.

As illustrated in FIG. 23, the smartphone 1 reflects the edited characters to the information representing the document displayed in the editing field 45. In the example illustrated in FIG. 23, the smartphone 1 changes "後" (go)

to be edited in the editing field 45 to "明日" (asu) and displays "明日" (asu) in an enhanced manner. The smartphone 1 newly allocates the edited "明日" (asu) to the first key 50g to which "後" (go) was allocated.

In the example illustrated in FIG. 23, the smartphone 1 displays images representing "ま" (ma), "た" (ma), "明日" (asu), "日" (jitsu), "お" (o), "会" (a), "い" (i) and "で" (de) in the document data 9F on the first keys 50i, 50h, 50g, 50f, 50e, 50d, 50c and 50b on the editing screen, respectively. The smartphone 1 displays multiple images representing the above described allocation pattern types on the second keys 52j, 52i, 52h, 52g and 52f on the screen, respectively. The smartphone 1 allocates the deletion function in the editing to the second key 52e and displays the image representing "delete" on the second key 52e.

For example, according to FIG. 23, after detecting the provisionally choosing operation on any one of the first keys 50i, 50h, 50g, 50f, 50e, 50d, 50c and 50b via the touch screen 2B, the smartphone 1 is able to read a character or a character array allocated to the corresponding first key 50. For example, when the user touches the first keys 50g and 50f sequentially, the smartphone 1 reads the characters and thus the user is able to recognize that there is the redundant character "日" (jitsu) followed by "明日" (asu). In order to delete the character of "日" (jitsu), the user performs a deleting operation on the smartphone 1.

Figure 24:
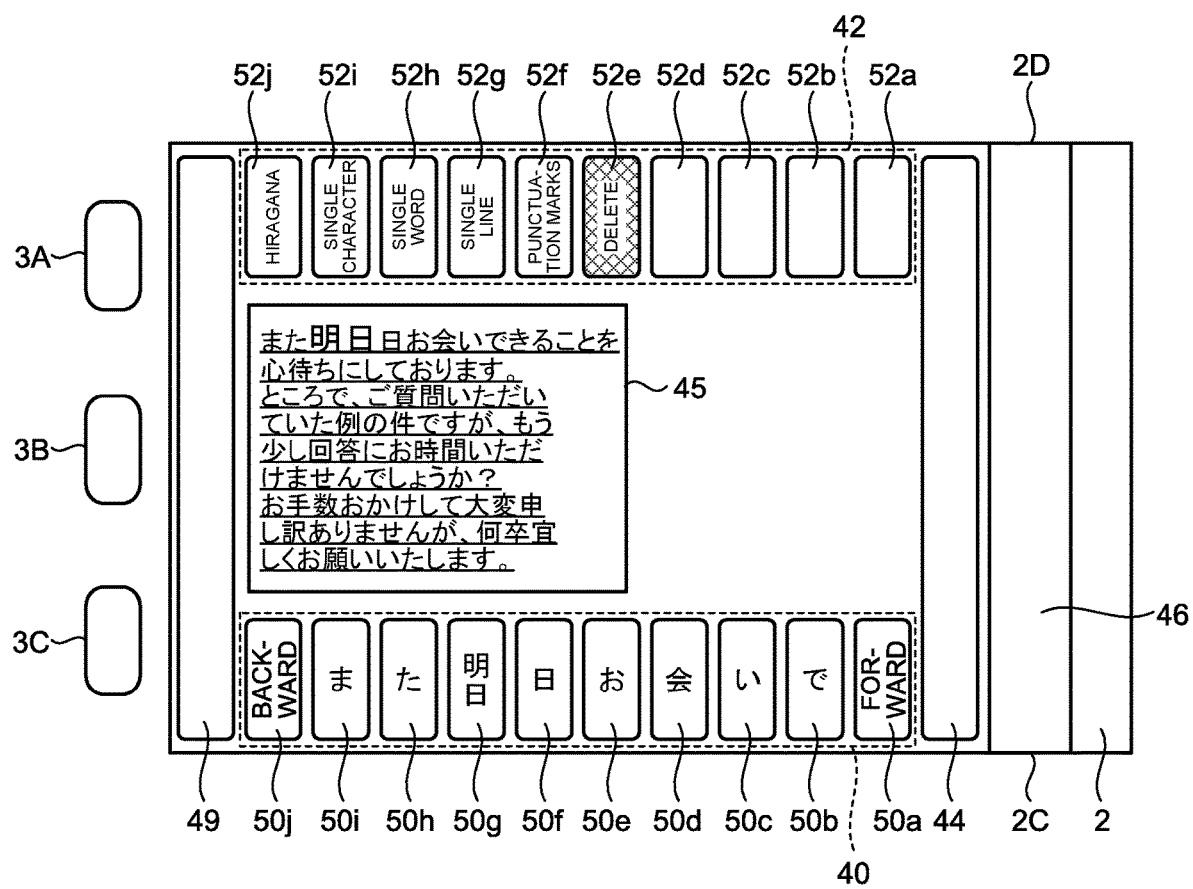
FIG. 24 is a diagram illustrating an exemplary display screen according to the character editing process.

As illustrated in FIG. 24, the user performs the choosing operation on the second key 52e representing "delete" in order to delete one character. After detecting the choosing operation on the second key 52e, the smartphone 1 determines that deletion of a character or a character array is requested. In this case, the smartphone 1 allocates one character or one character array to be edited to each of the first keys 50 on the editing screen. Accordingly, the smartphone 1 determines that deletion of one character is requested. For example, the smartphone 1 may make a notification indicating that deletion of one character is available by making a sound output.

Figure 25:
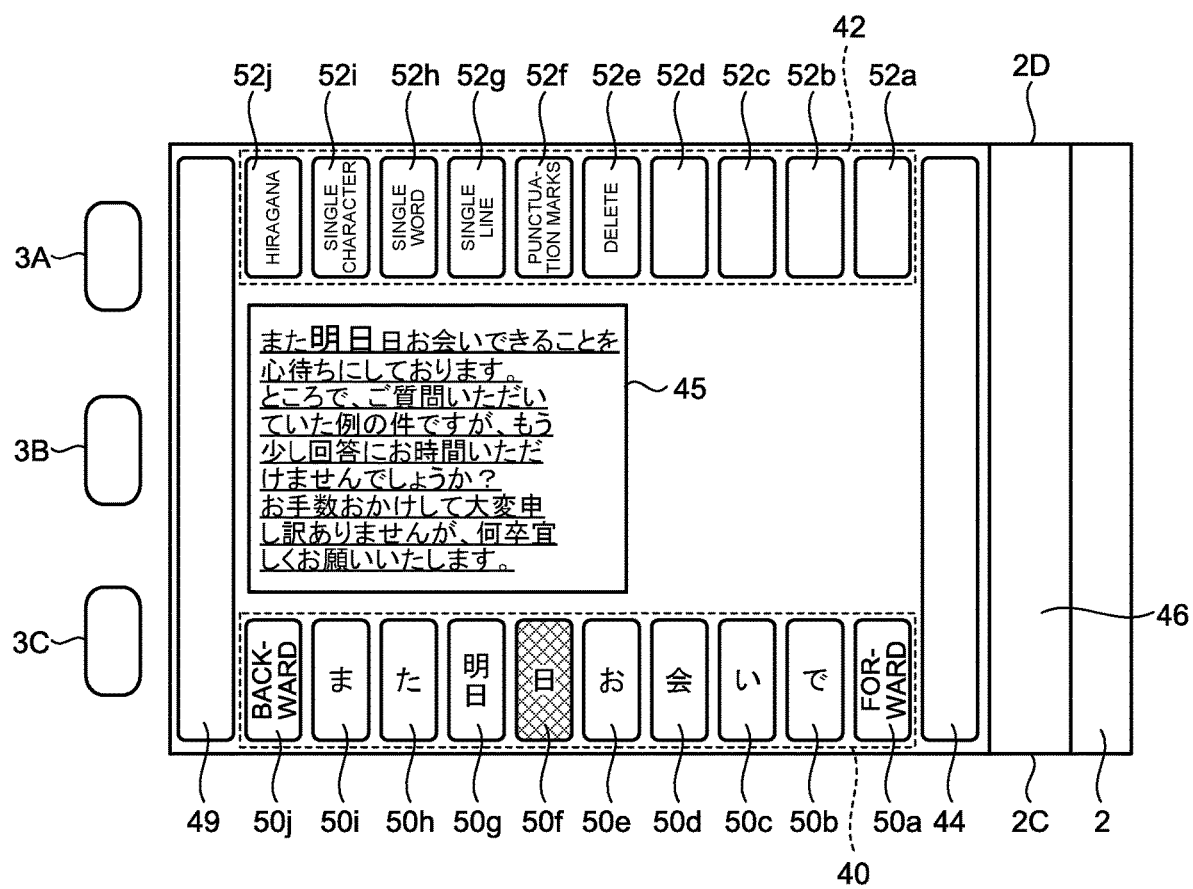
FIG. 25 is a diagram illustrating an exemplary display screen according to the character editing process.

As illustrated in FIG. 25, the user performs the choosing operation on the first key 50f representing "日" (jitsu) in order to delete the character "日" (jitsu). T the smartphone 1 changes the first key 50f to the chosen state after detecting the choosing operation on the first key 50f via the touch screen 2B. In this case, the smartphone 1 receives a confirmation for deleting the chosen character from the user and then deletes the character allocated to the first key 50f. In the example illustrated in FIG. 25, the smartphone 1 deletes the character "日" (jitsu) allocated to the first key 50f from the document data 9F. For example, the smartphone 1 notifies the user of the deletion of the character by performing the reading process. In the example illustrated in FIG. 25, the smartphone 1 makes an output sound of "日, . . . nichi of 日曜 has been deleted" (jitsu, . . . nichi of nichiyou has been deleted) from the speaker 11.

Figure 26:
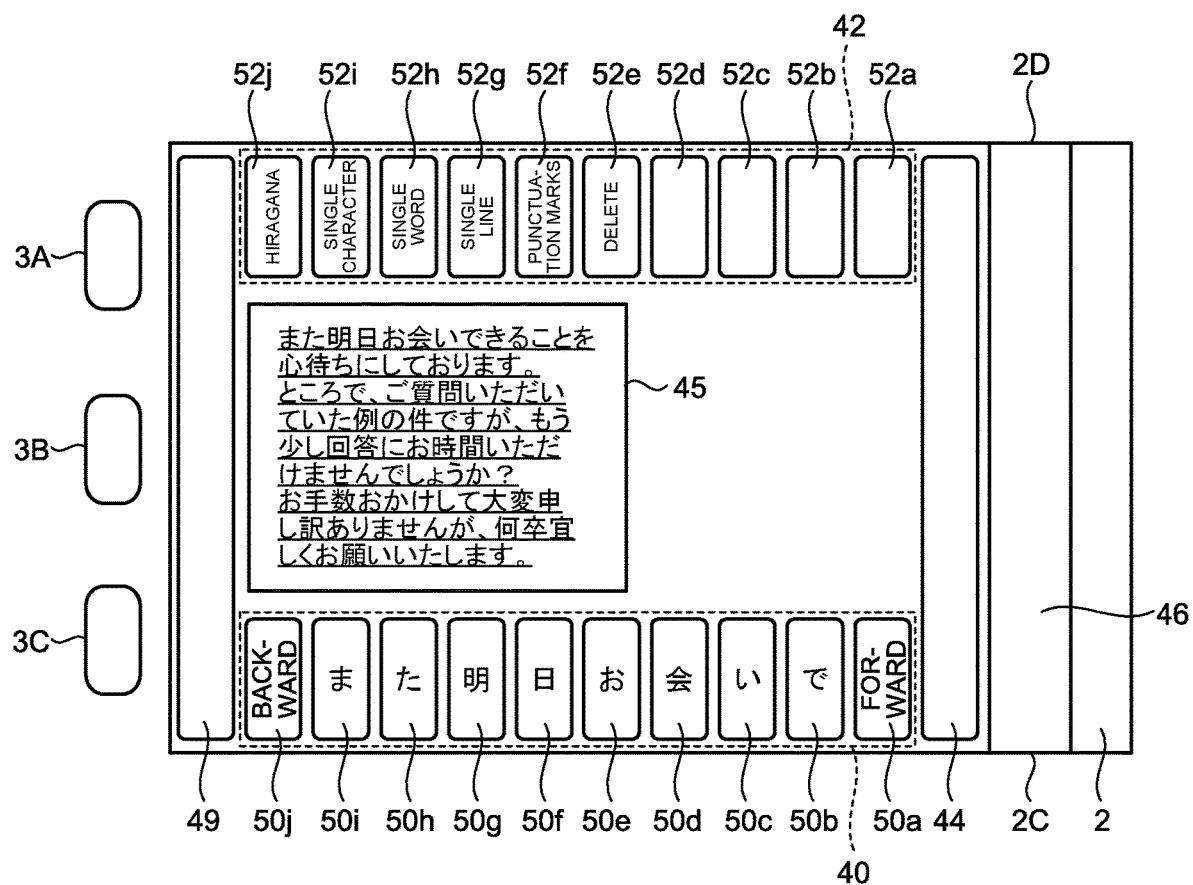
FIG. 26 is a diagram illustrating an exemplary display screen according to the character editing process.

As illustrated in FIG. 26, the smartphone 1 deletes the chosen character from the document displayed in the editing field 45. The smartphone 1 re-allocates the characters after the editing to the first keys 50. For example, the smartphone 1 displays images representing "ま" (ma), "た" (ma), "明" (a), "日" (su), "お" (o), "会" (a), "い" (i) and "で" (de) on the first keys 50i, 50h, 50g, 50f, 50e, 50d, 50c and 50b, respectively. As a result, when the user sequentially performs the provisionally choosing operation on the first keys 50i, 50h, 50g, 50f, 50e, 50d, 50c and 50b, the smartphone 1 reads the characters and this enables the user to check the edited characters. In the example illustrated in FIG. 26, the user is able to confirm that "後E" (gojitsu) in the document displayed in the editing field 45 is changed to "明E" (asu).

In this manner, when the user performs the choosing operation on the first key 50 to which a character or a character array is allocated, the smartphone is able to edit the character or the character array that is allocated to the first key 50. For example, it is difficult for visually impaired people to input characters and it is further difficult for them to find out a part of the document to be corrected. The smartphone 1 makes it possible to specify a part of the document to be eddited by operating the first keys 50 and change and check the character or the character array of the edited part of the document. Accordingly, for example, it is possible to lower difficulty in editing operations for visually impaired people.

With respect to the above-described embodiment, the case where, even when the amount of characters for the single first key 50 increases when editing one character, the smartphone 1 does not change the characters allocated to the first keys 50 except the character to be edited has been described; however the embodiments are not limited thereto. For example, when the amount of characters allocated to the first key 50 increases or decreases after the editing, the smartphone 1 may re-allocate the characters followed by the edited character and allocated to the first keys 50 at the time when the editing is fixed. For example, when the amount of characters allocated to the first key 50 increases or decreases after the editing, the smartphone 1 may request the user of the smartphone 1 to re-allocate the characters followed by the edited character and allocated to the first keys 50.

For example, in the example illustrated in FIG. 23, the smartphone 1 displays the images representing "ま" (ma), "た" (ma), "明日" (asu), "日" (jitsu), "お" (o), "会" (a), "い" (i) and "で" (de) in the document data 9F on the first keys 50i, 50h, 50g, 50f, 50e, 50d, 50c and 50b on the editing screen, respectively. In other words, unlike other first keys 50, two characters are allocated to the first key 50g. For example, when the user wish to allocate the characters after the editing to the first keys 50 one by one, the user performs the choosing operation on the second key 52i on the editing screen illustrated in FIG. 23. After detecting the choosing operation on the second key 52i via the touch screen 2B, the smartphone 1 changes the second key 52i on the editing screen to the chosen state. In this case, the smartphone 1 may output sound of, for example, "Reading by single character is set." from the speaker 11. By executing the character editing process, the smartphone 1 re-allocates the characters allocated to the first keys 50 after the editing according to the single character allocation pattern corresponding to the chosen second key 52i.

Figure 27:
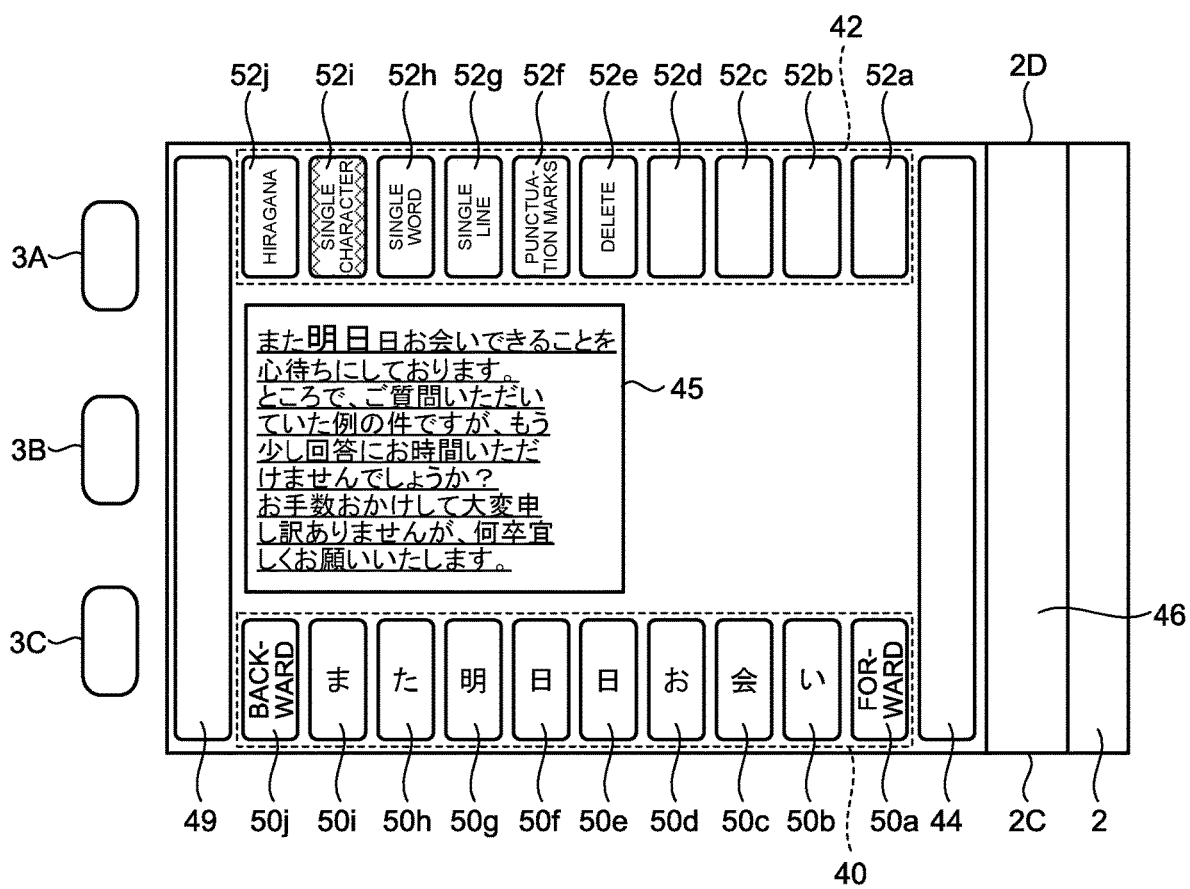
FIG. 27 is a diagram illustrating another exemplary display screen according to the character editing process.

FIG. 27 is a diagram illustrating another exemplary display screen according to the character editing process. In the example illustrated in FIG. 27, the smartphone 1 displays images representing "ま" (ma), "た" (ma), "明" (a), "日" (su), "日" (jitsu), "お" (o), "会" (a), "い" (i) after the editing on the first keys 50i, 50h, 50g, 50f, 50e, 50d, 50c and 50b, respectively. For example, when the user sequentially touches the first keys 50g, 50f and 50e, the smartphone 1 reads the characters and thus the user is able to recognize that there is the redundant character "日" (jitsu) followed by "明" (a) and "日" (su). In this case, in order to delete the character "日" (jitsu), it is satisfactory if the user performs, on the smartphone 1, an operation of deleting the character "日" that is allocated to the second key 50f or the second key 50e. For example, when the character allocated to the first key is deleted, the smartphone 1 may re-allocate the characters after the editing to the first keys 50 automatically or according to a request from the user.

Figure 28:
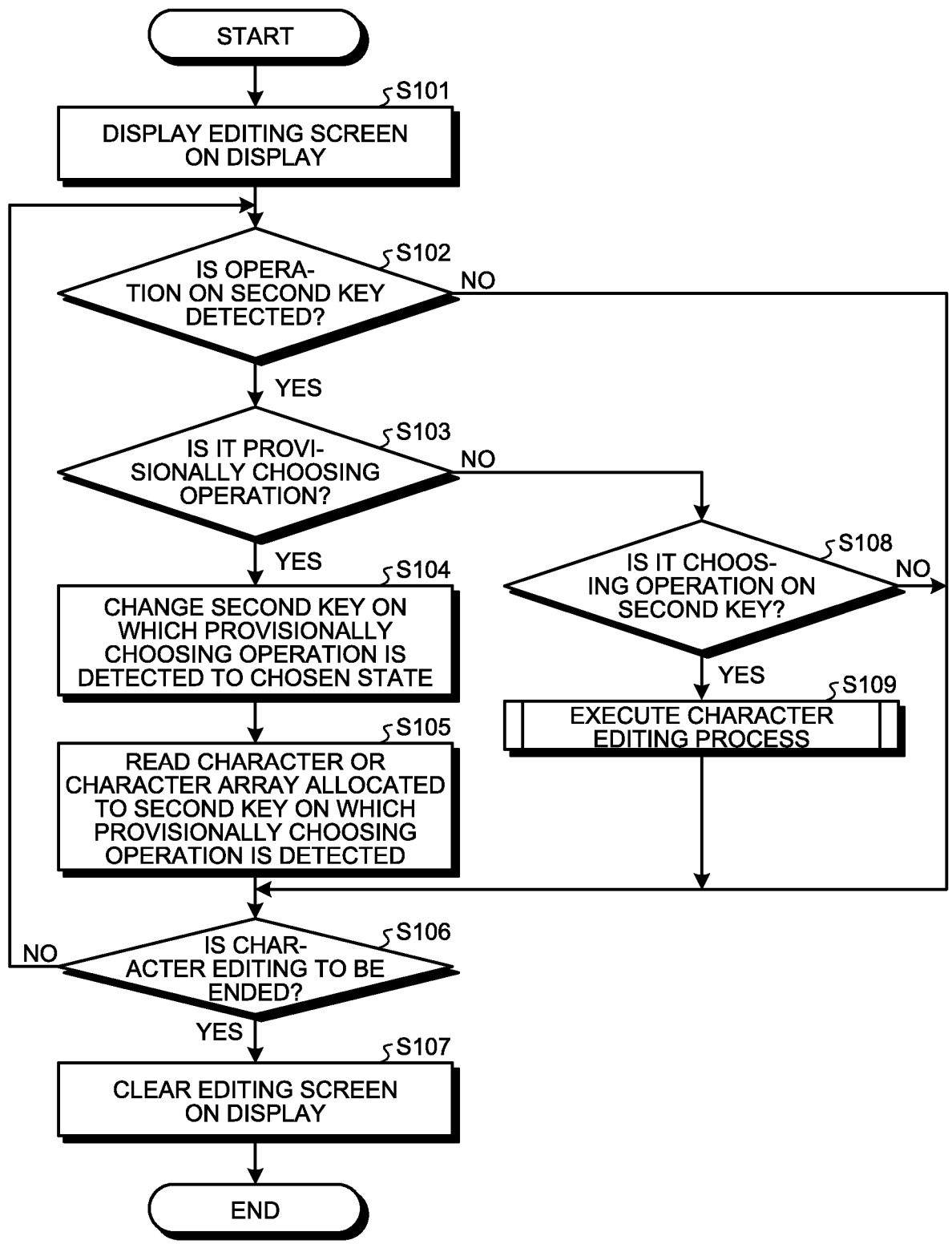
FIG. 28 is a flowchart of an exemplary process procedure of control performed by the smartphone.
Figure 29:
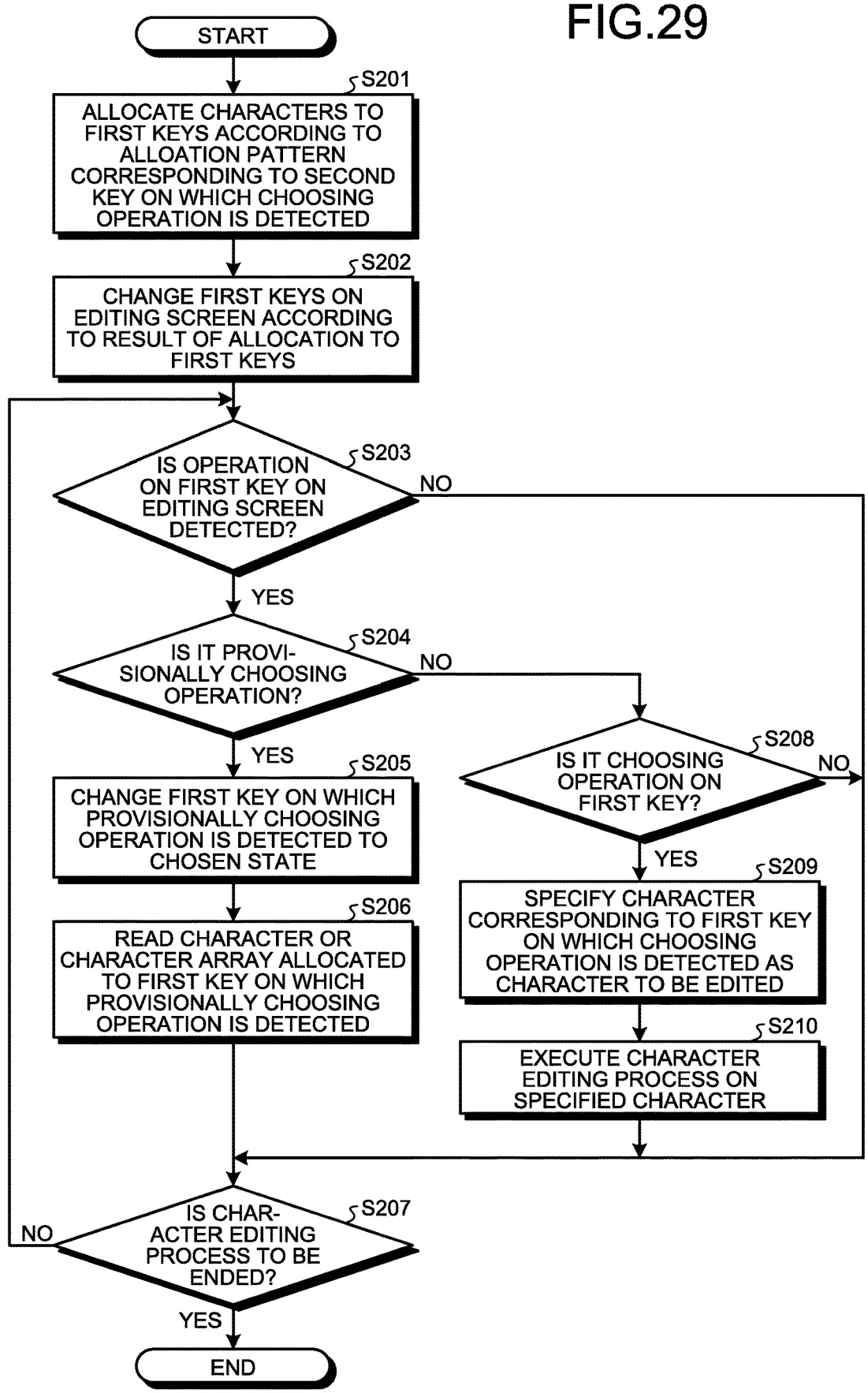
FIG. 29 is a flowchart of an exemplary process procedure of the character editing process performed by the smartphone.

With reference to FIGS. 28 and 29, the process procedure of control character editing performed by the smartphone 1 will be described. FIG. 28 is a flowchart of an exemplary process procedure of control performed by the smartphone 1. The process procedure illustrated in FIG. 28 is implemented by the controller 10 by executing the input program 9B. The process procedure illustrated in FIG. 28 is the process executed in the state where the character editing is requested by the user.

As illustrated in FIG. 28, the controller 10 of the smartphone 1 displays the editing screen on the display 2A (Step S101). For example, the controller 10 displays the screen illustrated in FIG. 14 on the display 2A. The controller 10 determines whether an operation on the second key 52 is detected via the touch screen 2B (Step S102). When it is determined that no operation on the second key 52 is detected (NO at Step S102), the controller 10 proceeds to Step S106. When it is determined that an operation on the second key 52 is detected (YES at Step S102), the controller 10 proceeds to Step S103. The controller 10 determines whether it is a provisionally choosing operation on the second key 52 (Step S103). When it is determined that it is a provisionally choosing operation on the second key 52 (YES at Step S103), the controller 10 proceeds to Step S104.

The controller 10 changes the second key 52 on which the provisionally choosing operation is detected to a chosen state (Step S104). For example, the controller 10 displays the second key 52 on the editing screen in a display manner corresponding to the provisionally chosen state. For example, when there is already the second key 52 in the chosen state, the controller 10 is able to releases the chosen state of the second key 52. The controller 10 reads a character or a character array that is allocated to the second key 52 on which the provisionally choosing operation is detected (Step S105). For example, the controller 10 reads the character or the character array that is allocated to the second key 52 by performing the reading process.

After ending the reading, the controller 10 determines whether to end the character editing (Step S106). For example, when an ending operation for the character editing or a request for ending the character editing is detected, the controller 10 determines to end the character editing. When the controller 10 determines not to end the character editing (NO at Step S106), the controller 10 returns to Step S102 already described. When the controller 10 determines to end the character editing (YES at Step S106), the controller 10 proceeds to Step S107. The controller 10 clears the editing screen on the display 2A (Step 107). After clearing the editing screen, the controller 10 ends the process procedure illustrated in FIG. 28.

When it is determined that it is not the provisionally choosing operation on the second key 52 (NO at Step S103), the controller 10 proceeds to Step 108. The controller 10 determines whether it is the choosing operation on the second key 52 (Step S108). When it is determined that it is not the choosing operation on the second key 52 (NO at Step S108), the controller 10 proceeds to Step S106 already described. When it is determined that it is the choosing operation on the second key 52 (YES at Step S108), the controller 10 proceeds to Step S109. The controller 10 executes the character editing process (Step S109). The character editing process will be described later. After ending the character editing process, the controller 10 proceeds to Step S106 already described.

FIG. 29 is a flowchart of an exemplary process procedure of the character editing process performed by the smartphone 1. The process procedure illustrated in FIG. 29 is implemented by the controller 10 by executing the input program 9B. The process procedure illustrated in FIG. 29 is the process that is executed at Step S109 illustrated in FIG. 28.

As illustrated in FIG. 29, the controller 10 of the smartphone 1 allocates characters to the first keys 50 according to the allocation pattern corresponding to the second key 52 on which the choosing operation is detected (S201). For example, as illustrated in FIG. 14, the controller 10 allocates the characters in the document data 9F to the first keys 50b to 50i according to the chosen allocation pattern. The controller 10 changes the first keys 50 on the editing screen based on the result of allocation to the first keys 50 (S202). For example, the controller 10 displays the images representing the allocated characters on the first keys 50.

The controller 10 determines whether an operation on the first key 50 on the editing screen is detected via the touch screen 2B (S203). When it is determined that no operation on the first key 50 is detected (NO at S203), the controller 10 proceeds to S207 described later. When it is determined that an operation on the first key 50 is detected (YES at S203), the controller 10 proceeds to S204. The controller 10 determines whether it is a provisionally choosing operation on the first key 50 (S204). When it is determined that it is a provisionally choosing operation on the first key 50 (YES at S204), the controller 10 proceeds to S205.

The controller 10 changes the first key 50 on which the provisionally choosing operation is detected to the chosen state (S205). For example, the controller 10 displays the first key 50 on the editing screen in the display manner corresponding to the provisionally chosen state. For example, when there is already the first key 50 in the chosen state, the controller 10 is able to releases the chosen state of the first key 50. The controller 10 reads the character or character array that is allocated to the first key 50 on which the provisionally choosing operation is detected (S206). For example, the controller 10 reads the character or character array allocated to the first key 50 by performing the reading process.

The controller 10 determines whether to end the character editing process (S207). For example, when an ending operation of the character editing or a request for clearing the editing screen by the user is detected, the controller 10 determines to end the character editing process. When the controller 10 determines not to end the character editing process (NO at S207), the controller 10 returns to S203. When the controller 10 determines to end the character editing process (YES at S207), the controller 10 ends the process procedure illustrated in FIG. 29.

When it is determined that it is not the provisionally choosing operation on the first key 50 (NO at S204), the controller 10 proceeds to S208. The controller 10 determines whether it is the choosing operation on the first key 50 (S208). When it is determined that it is not the choosing operation on the first key 50 (NO at S208), the controller 10 proceeds to S207 already described. When it is determined that it is the choosing operation on the first key 50 (YES at S208), the controller 10 proceeds to Step 209.

The controller 10 specifies the character corresponding to the first key 50 on which the choosing operation is detected as the character to be edited (S209). The controller 10 executes the character editing process on the specified character (S210). For example, the character that is specified as the character to be edited may be a character array. For example, the character editing process includes a process of causing the user to edit the character to be edited that is allocated to the first key 50. For example, the character editing process includes a process of causing the user to input a character by using the second key 52 and the third key 54 while maintaining the character allocated to the first key 50. For example, the character editing process includes a process of converting the character that is input by the user. For example, the character editing process includes a process of reading the character that is edited by performing the reading process. For example, the character editing process includes a process of ending the editing of the character to be edited when a fixing operation of the editing performed by the user is detected. For example, the editing process includes a process of causing the user to delete the character allocated to the first key 50. After ending the editing process, the controller 10 proceeds to S207.

With respect to the above-described embodiment, the case where the smartphone 1 allocates the characters or character arrays to be edited to the first keys 50 on the editing screen has been described; however, the embodiments are not limited thereto. For example, the smartphone 1 may allocate the characters or character arrays to be edited to the second keys 52 or the third keys 54.

With respect to the above-described embodiment, the case where the smartphone 1 displays the images of the allocated characters or character arrays on the first keys 50 has been described; however, the embodiments are not limited thereto. For example, it is satisfactory if the smartphone 1 allocate a key input in a position corresponding to each of the first keys 50 and display no image. For example, it is satisfactory if, when the touch screen 2B detects an input in each area, the smartphone 1 detect the input as a key input and the touch screen 2B allocate a virtual key to each area. Accordingly, the electronic device may enable character editing in a state where no image is displayed on the display 2A, or the electronic device need not include the display 2A. When the electronic device displays no image, it is preferable that a sound output be made when the above-described key operation is detected.

The embodiments disclosed herein may be modified without departing from the scope of the application. Furthermore, the embodiments disclosed herein and modifications thereof may be combined as appropriate. For example, the above-described embodiments may be modified as described below.

Each of t programs illustrated in FIG. 4 may be divided into multiple modules or may be combined with another program.

With respect to the above-described embodiment, the smartphone 1 has been described as an exemplary electronic device including the touch screen 2B; however, the electronic device according to the attached claims is not limited to smartphones. The electronic device according to the application may be a portable electronic device other than a smartphone. The portable electronic device includes, for example, mobile phones, tablets, portable personal computers, digital cameras, smart watches, media players, electronic book readers, navigators, and game machines; however, the electronic device is not limited thereto.

Figure 30:
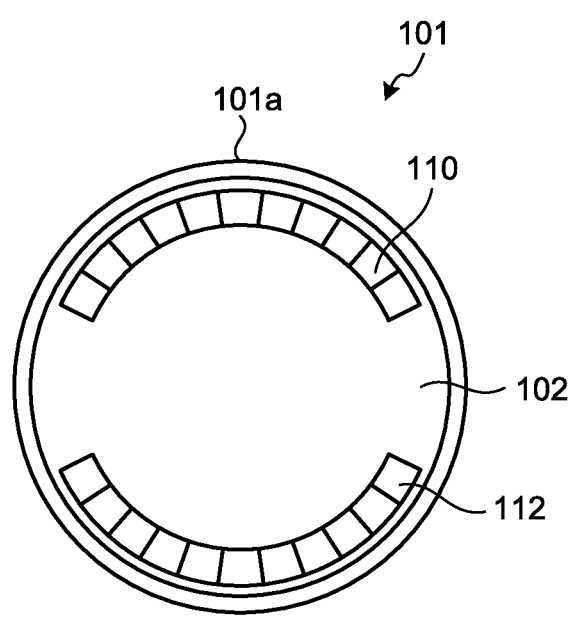
FIG. 30 is a front view of another exemplary electronic device.

FIG. 30 is a front view of another exemplary electronic device. An electronic device 101 illustrated in FIG. 30 includes a housing 101a and a touch screen display 102 whose peripheries are circular. In the electronic device 101, a first key area 110 and a second key area 112 are provided in different positions along the peripheries of the housing 101a and the touch screen display 102. Providing the first key area 110 and the second key area 112 along the peripheries of the housing 101a and the touch screen display 102 when the peripheries are circular enables easy key input even in a state where the touched area is not checked. According to FIG. 30, the electronic device without sides includes the housing 101a and the touch screen display 102 whose outer shapes (peripheries) are circular; however, the embodiments are not limited thereto. The electronic device may include the housing 101a and the touch screen display 102 whose outer shapes (peripheries) are oval. The electronic device may include the housing 101a and the touch screen display 102 whose outer shapes (peripheries) are polygonal but not rectangular, or are a shape that is a combination of arc and straight line.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
    a touch screen;
    a storage configured to store a character array; and
    at least one controller configured to:
        display a plurality of first keys arranged along a periphery of the touch screen,
        display a plurality of second keys arranged on the touch screen,
        display the character array in an editing field between the plurality of first keys and the plurality of second keys,
        automatically allocate, based on information of the character array in the editing field, a respective allocation pattern to each of the plurality of second keys, wherein each allocation pattern corresponds to a different key allocation function based on the information of the character array and allocates characters or phrases included in the character array to the first keys in a distinct manner,
        automatically allocate, based on a detected selection of a second key of the plurality of second keys, each character or phrase displayed in the character array to each of the first keys in a one-to-one relationship and in accordance with the associated allocation pattern, and
        edit a character or phrase displayed in the editing field and a first key to which the character or the phrase is allocated after an operation is detected, via the touch screen, on the first key to which the character or the phrase is allocated, wherein the edited character or phrase and the edited first key display a same character or phrase.

2. The electronic device of claim 1, wherein the plurality of first keys is arranged in an arc-shape.

3. The electronic device of claim 1, wherein the at least one controller is further configured to automatically change the allocation of at least one first key of the plurality of first keys in response to selecting a different second key of the plurality of second keys following the detected selection of the second key of the plurality of second keys.

4. The electronic device of claim 1, wherein the at least one controller is further configured to display a plurality of third keys, in response to a selection of a first key of the plurality of first keys, between the plurality of first keys and the plurality of second keys.

5. The electronic device of claim 1, wherein the at least one controller is further configured to instruct the touch screen to display the plurality of first keys prior to the detected selection of the second key of the plurality of second keys.

6. The electronic device of claim 1, wherein the at least one controller is further configured to automatically change the allocation of at least one first key of the plurality of first keys in response to selecting a different second key of the plurality of second keys following the detected selection of the second key of the plurality of second keys without an intervening selection of any of the plurality of first keys.

7. The electronic device of claim 1, wherein the at least one controller is further configured to output a sound of the character or phrase allocated to the first key on which the operation is detected.

8. A control method performed by an electronic device including a touch screen, and a storage configured to store a character array,
the control method comprising:
displaying a plurality of first keys arranged along a periphery of the touch screen;
displaying a plurality of second keys arranged on the touch screen;
displaying the character array in an editing field between the plurality of first keys and the plurality of second keys;
automatically allocating, based on information of the character array in the editing field, a respective allocation pattern to each of the plurality of second keys, wherein each allocation pattern corresponds to a different key allocation function based on the information of the character array and allocates characters or phrases included in the character array to the first keys in a distinct manner;
automatically allocating, based on a detected selection of a second key of the plurality of second keys, each character or phrase displayed in the character array to each of the first keys in a one-to-one relationship and in accordance with the associated allocation pattern; and
editing a character or phrase displayed in the editing field and a first key to which the character or the phrase is allocated after an operation is detected, via the touch screen, on the first key to which the character or the phrase is allocated, wherein the edited character or phrase and the edited first key display a same character or phrase.

9. The method of claim 8, further comprising displaying the plurality of first keys is arranged in an arc-shape.

10. The method of claim 8, further comprising automatically changing the allocation of at least one first key of the plurality of first keys in response to selecting a different second key of the plurality of second keys following the detected selection of the second key of the plurality of second keys.

11. The method of claim 8, further comprising displaying a plurality of third keys, in response to a selection of a first key of the plurality of first keys, between the plurality of first keys and the plurality of second keys.

12. The method of claim 8, further comprising displaying the plurality of first keys prior to the detected selection of the second key of the plurality of second keys.

13. A non-transitory storage medium that stores a program for causing, when executed by an electronic device including a touch screen, and a storage configured to store a character array, the electronic device to execute:
displaying a plurality of first keys arranged along a periphery of the touch screen;
displaying a plurality of second keys arranged on the touch screen;
displaying the character array in an editing field between the plurality of first keys and the plurality of second keys;
automatically allocating, based on information of the character array in the editing field, a respective allocation pattern to each of the plurality of second keys, wherein each allocation pattern corresponds to a different key allocation function based on the information of the character array and allocates characters or phrases included in the character array to the first keys in a distinct manner;
automatically allocating, based on a detected selection of a second key of the plurality of second keys, each character or phrase displayed in the character array to each of the first keys in a one-to-one relationship and in accordance with the associated allocation pattern; and
editing a character or phrase displayed in the editing field and a first key to which the character or the phrase is allocated after an operation is detected, via the touch screen, on the first key to which the character or the phrase is allocated, wherein the edited character or phrase and the edited first key display a same character or phrase.

14. The non-transitory storage medium of claim 13, wherein the program is configured to further cause the electronic device to instruct the touch screen to display the plurality of first keys is arranged in an arc-shape.

15. The non-transitory storage medium of claim 13, wherein the program is configured to further cause the electronic device to automatically change the allocation of at least one first key of the plurality of first keys in response to selecting a different second key of the plurality of second keys following the detected selection of the second key of the plurality of second keys.

* * * * *